(12) United States Patent
Duncan et al.

(10) Patent No.: US 7,529,029 B2
(45) Date of Patent: *May 5, 2009

(54) POLARIZING BEAM SPLITTER

(75) Inventors: John E. Duncan, Amelia, OH (US); Michael W. O'Keefe, Cincinnati, OH (US); William E. Phillips, III, Cincinnati, OH (US); Jiaying Ma, Maplewood, MN (US); Patrick R. Destain, Plano, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/427,091

(22) Filed: Jun. 28, 2006

(65) Prior Publication Data

US 2007/0030456 A1    Feb. 8, 2007

Related U.S. Application Data

(63) Continuation-in-part of application No. 11/192,655, filed on Jul. 29, 2005, now Pat. No. 7,362,507.

(51) Int. Cl.
  *G02B 27/14* (2006.01)
(52) U.S. Cl. .................. 359/637; 359/634; 359/638
(58) Field of Classification Search ......... 359/629–640; 353/20, 31, 33, 81
See application file for complete search history.

(56) References Cited

U.S. PATENT DOCUMENTS

| | | | |
|---|---|---|---|
| 4,342,863 A | 8/1982 | Hohokabe et al. | |
| 4,406,520 A * | 9/1983 | Sato | 359/487 |
| 4,627,688 A * | 12/1986 | Kobayashi et al. | 359/634 |
| 5,381,278 A | 1/1995 | Shingaki et al. | 359/256 |
| 5,530,586 A | 6/1996 | Yasugaki | |
| 5,579,138 A | 11/1996 | Sannohe et al. | 349/96 |
| 5,771,124 A | 6/1998 | Kintz et al. | 359/633 |
| 5,882,774 A | 3/1999 | Jonza et al. | |
| 5,962,114 A | 10/1999 | Jonza et al. | |
| 5,991,103 A | 11/1999 | Togino | 359/834 |
| 6,023,373 A | 2/2000 | Inoguchi | 359/633 |
| 6,171,421 B1 | 1/2001 | Murata et al. | |
| 6,331,916 B1 | 12/2001 | Mukawa | |
| 6,335,838 B1 | 1/2002 | Kasai et al. | |
| 6,396,631 B1 | 5/2002 | Ouderkirk | |
| 6,426,837 B1 | 7/2002 | Clark et al. | |
| 6,486,997 B1 | 11/2002 | Bruzzone et al. | |
| 6,592,224 B2 | 7/2003 | Ito et al. | |

(Continued)

FOREIGN PATENT DOCUMENTS

CH    260 901    4/1949

(Continued)

OTHER PUBLICATIONS

Stephen Eckhardt et al., "3M PBS for High Performance LCOS Optical Engine".

(Continued)

*Primary Examiner*—Mohammed Hasan

(57) ABSTRACT

A polarizing beam splitter that includes at least one prism, and a reflective polarizing film. The prism comprises a first polymeric material, and has at least one curved outer surface and an incident surface, where the reflective polarizing film is disposed adjacent the incident surface.

8 Claims, 14 Drawing Sheets

U.S. PATENT DOCUMENTS

| | | |
|---|---|---|
| 6,609,795 B2 | 8/2003 | Weber et al. |
| 6,672,721 B2 | 1/2004 | Aastuen et al. |
| 6,719,426 B2 | 4/2004 | Magarill et al. |
| 6,778,228 B2 | 8/2004 | Murakami et al. |
| 6,786,604 B2 | 9/2004 | Aastuen et al. |
| 2001/0022689 A1 | 9/2001 | Takeyama |
| 2003/0133060 A1 | 7/2003 | Shimada |
| 2003/0184864 A1 | 10/2003 | Bruzzone et al. |
| 2004/0233393 A1 | 11/2004 | Magarill et al. |
| 2005/0001983 A1 | 1/2005 | Weber et al. |
| 2005/0012996 A1 | 1/2005 | Miyazawa et al. |
| 2005/0083586 A1 | 4/2005 | Komiya et al. ............... 359/737 |
| 2006/0139730 A1 | 6/2006 | Oehler et al. ............... 359/291 |

FOREIGN PATENT DOCUMENTS

| | | |
|---|---|---|
| EP | 0 398 431 | 11/1990 |
| EP | 0 901 023 | 3/1999 |
| EP | 0 947 869 | 10/1999 |
| GB | 2 413 858 | 11/2005 |
| JP | HEI 5-142499 | 6/1993 |
| JP | 05 257001 | 10/1993 |
| JP | 2000-314809 | 11/2000 |
| JP | 2002-55231 | 2/2002 |
| JP | 2003-75614 | 3/2003 |
| JP | 2003-240926 | 8/2003 |
| WO | WO 02/063373 | 8/2002 |
| WO | WO 02/097515 | 12/2002 |

OTHER PUBLICATIONS

Charles L. Bruzzone et al., "10.4 High-Performance LcoS Optical Engine Using Cartesian Polarizer Technology", *SID 03 Digest*.

Charles L. Bruzzone et al., "6.1: Photostability of Polymeric Cartesian Polarizing Beam Splitters", *SID 04 Digest*.

\* cited by examiner

POLARIZING BEAM SPLITTER

CROSS-REFERENCE TO RELATED APPLICATION(S)

This application is a continuation-in-part of U.S. patent application Ser. No. 11/192,655, entitled "Polarizing Beam Splitter", and filed on Jul. 29, 2005, now U.S. Pat. No. 7,362,507 the disclosure of which is incorporated by reference herein in its entirety.

BACKGROUND OF THE INVENTION

The present disclosure relates to polarization separation devices, which may be used in image display systems. In particular, the present disclosure relates to reflective and transmissive polarizing beam splitters (PBSs), which may be used in image display systems that incorporate polarization-rotating, image-forming devices.

Image display systems incorporating PBSs are used to form images on viewing screens, such as projection displays. A typical image display system incorporates an illumination source that is arranged so that light rays from the illumination source reflect off of an image-forming device or imager that contains the desired image to be projected. The system folds the light rays such that the light rays from the illumination source and the light rays of the projected image share the same physical space between a PBS and the imager.

The imager of the image display system is typically a polarization-rotating, image-forming device, such as a liquid crystal on silicon (LCoS) device, which operates by rotating the polarization of the light rays. LCoS imagers are polarization rotating, which means that polarized light rays are either transmitted with their polarizations substantially unmodified for the darkest state or transmitted with their polarizations rotated to provide a desired gray scale. Thus, an input beam comprising polarized light rays is generally used for illuminating an LCoS imager.

BRIEF SUMMARY OF THE INVENTION

The present disclosure relates to a PBS that includes at least one prism and a reflective polarizing film. The prism comprises a polymeric material, and has at least a first curved outer surface and an incident surface, where the reflective polarizing film is disposed adjacent the incident surface. The prism is configured to transmit light through at least the first curved outer surface. The reflective polarizing film may comprise multiple layers of different polymeric materials. The PBS is suitable for folding light rays, may be used in compact image display systems, and is easy to manufacture. The present disclosure is further related to an image display system that includes the PBS of the present disclosure.

While the above-identified drawing figures set forth several exemplary embodiments of the disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the disclosure. The figures may not be drawn to scale. Like reference numbers have been used throughout the figures to denote like parts.

DETAILED DESCRIPTION

Figure 1:
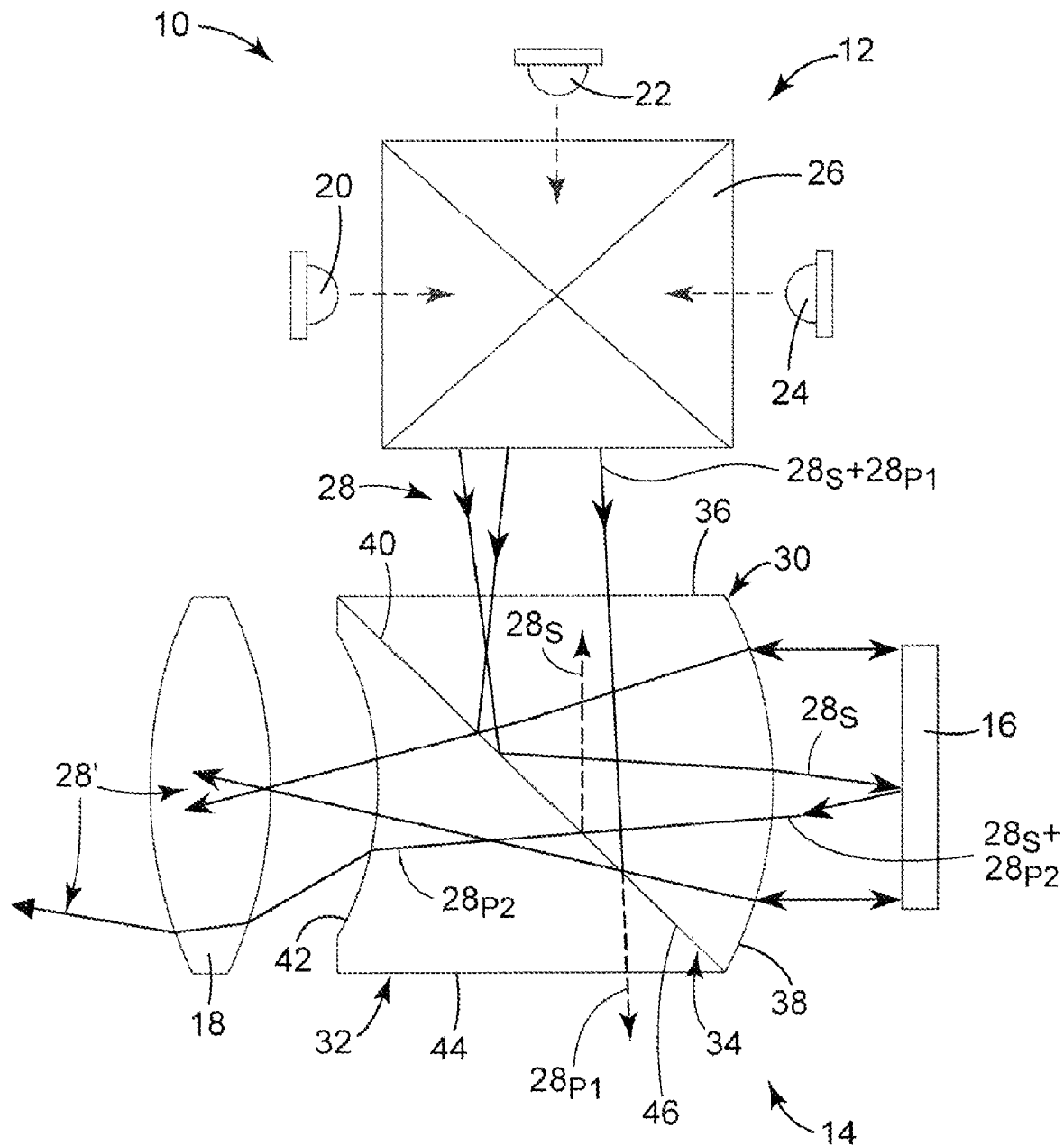
FIG. 1 is a schematic illustration of an image display system, which includes an exemplary reflective PBS of the present disclosure.

Use of a PBS according to the present disclosure offers an attractive design because it can function to both polarize and fold light rays. FIG. 1 is a schematic illustration of an optical system 10, such as an image display system, which may be used in a variety of display devices, such as mini-projection displays, head-mounted displays, virtual viewers, electronic viewfinders, heads-up displays, optical computing, optical correlation, and other optical viewing systems. System 10 includes illumination source 12, PBS 14 of the present disclosure, imager 16, and projection lens 18, which may include one or more optical elements. The exemplary PBS 14 is a reflective PBS capable of reducing the number of imaging optics required to direct light to a viewing screen or a viewer (not shown). This correspondingly allows system 10 to display images in compact devices, such as wireless phones.

Exemplary illumination source 12 is a three-component light source for providing red, green, and blue or other color components of the projected image. Illumination source 12 may include light source of a first color 20, such as one or more red light-emitting diodes (LEDs), light source of a second color 22, such as one or more blue LEDs, light source of a third color 24, such as one or more green LEDs, and color combiner 26. Light sources of the first 20, second 22, and third 24 colors respectively emit first, second, and third wavelength light toward color combiner 26. Illumination source 12 may also include ball lenses (not shown) disposed around each of red LED, green LED, and blue LED for further capturing and directing colored light toward color combiner 26. Color combiner 26 can be an X-cube configuration color combiner or another suitable color combiner that combines the received colored light and directs light beam 28 toward PBS 14. Light beam 28 from illumination source 12 contains light of the first, second and third wavelengths, (e.g., red, green, and blue wavelengths) and includes both s-polarized and p-polarized components.

Exemplary PBS 14 includes a first prism, here, input prism 30, a second prism, here, output prism 32, and reflective polarizing film 34. Input prism 30 and output prism 32 are low-birefringence, polymeric prisms disposed adjacent each other on opposing sides of reflective polarizing film 34. Input prism 30 includes an outer surface 36, first curved outer surface 38, and first incident surface 40. Similarly, output prism 32 includes second curved outer surface 42, outer surface 44, and second incident surface 46. As shown in FIG. 1, first curved outer surface 38 is a convex surface and second curved outer surface 42 is a concave surface. Curved outer surfaces 38 and 42 function as lenses that are integrated into PBS 14, which redirect the rays of light beam 28 that transmit through them. This reduces the need for additional imaging optics. Those of ordinary skill in the art will readily appreciate that the curvatures and placements of curved outer surfaces 38 and 42 relative to illumination source 12, polarizing film 34, projection lens 18, and the viewing screen or a viewer may be predetermined for directing the rays of light beam 28. In some exemplary embodiments, the curvature of curved outer surfaces 38 and 42 may be used to reduce or eliminate the need for the projection lens 18.

Reflective polarizing film 34 can be any reflective polarizing film known to those of skill in the art, such as a linear reflective polarizing film or a circular reflective polarizing film. For example, reflective polarizing film 34 can be a polymeric reflective polarizing film that is secured between incident surfaces 40 and 46 of input prism 30 and output prism 32, respectively. Exemplary polarizing film 34 splits light beam 28 received from illumination source 12 into reflected polarization components (s-polarized light rays) and transmitted polarization components (p-polarized light rays). Specific examples of reflective polarizing films suitable for use in the embodiments of the present disclosure include birefringent, polymer, multi-layer optical films (MOF) manufactured by 3M Corporation, St. Paul, Minn., such as those described in Jonza et al., U.S. Pat. No. 5,882,774; Weber et al., U.S. Pat. No. 6,609,795; and Magarill et al., U.S. Pat. No. 6,719,426, the disclosures of which are hereby incorporated by reference herein.

In some exemplary embodiments, reflective polarizing film 34 may include a first layer and a second layer, where the polymeric materials of the first and second layer are different. In one embodiment of the present disclosure, reflective polarizing film 34 may include a multi-layer stack of alternating layers of different polymer materials, as disclosed in Weber et al., U.S. Pat. No. 6,609,795. In another embodiment of the present disclosure, multiple reflective polarizing films may be used.

Suitable polymeric linear reflective polarizing films are typically characterized by a large refractive index difference between different materials along a first direction in the plane of the film and a small refractive index difference between different materials along a second direction in the plane of the film, orthogonal to the first direction. In some exemplary embodiments, reflective polarizing films are also characterized by a small refractive index difference between the different polymeric materials along the thickness direction of the film (e.g., between the first and second layers of different polymeric materials). Examples of suitable refractive index differences between the first and second layers of different polymeric materials in the stretched direction (i.e., x-direction) range from about 0.15 to about 0.20. The refractive indices in the non-stretched directions (i.e., the y-direction and the z-direction) are desirably within about 5% of one another for a given layer, and within about 5% of the corresponding non-stretched directions of an adjacent layer.

The polymeric materials selected for the layers of reflective polarizing film 34 may include materials that exhibit low levels of light absorption. For example, polyethylene terephthalate (PET) exhibits an absorption coefficient of less than $1.0 \times 10^{-5}$ centimeter$^{-1}$. Accordingly, for reflective polarizer film 34 that includes PET and has a thickness of about 125 micrometers, the calculated absorption is about 0.000023%.

Low absorptions are desirable because polarizers are exposed to very high light density, which can lead to the failure of the polarizers. For example, absorptive-type polarizer films absorb all the light with unwanted polarization. This generates significant heat. Substrates with high thermal conductivity, such as sapphire, or an air gap, are therefore needed to conduct the heat away from the polarizer films. Moreover, the substrates are exposed to high heat loads, which correspondingly generate thermal birefringence in the substrates. Thermal birefringence in the substrates degrade the contrast and contrast uniformity of the polarizer films. As a result, only few materials can be qualified for the substrates (e.g., sapphire, quartz, leads content glass, and ceramics).

Similarly, wire-grid polarizers, which use thin metal stripes (e.g., aluminum stripes) coated on transparent substrates, absorb small portions of the received light. This also generates heat in the substrates, and such embodiments may benefit from disposing an air gap or heat-conductive medium adjacent the polarizer. For example, 5-10% of the light is absorbed by aluminum stripes in the same manner as an aluminum mirror surface. Since the performance of the wire-grid polarizer is sensitive to the geometric stability of the metal stripes, a small change in the substrates due to thermal expansion can degrade the polarizer's performance.

In contrast, the use of polymeric materials with low absorption coefficients (e.g., PET) allows reflective polarizer film 34 to be used without the need of high-thermal conductivity substrates or air gaps to conduct heat way from reflective polarizing film 34. As such, polymeric reflective polarizer film 34 may be used for extended periods of time with input prism 30 and output prism 32.

Imager 16 is a polarization-rotating component, such as an LcoS imager (e.g., ferroelectric LcoS), a liquid crystal display (LCD) imager, or a high-temperature polysilicon (HTPS) imager, which is disposed adjacent curved outer surface 38 of input prism 30. Imager 16 reflects and rotates the polarization of the rays of light beam 28 based on whether the pixels of imager 16 are "on" or "off". The individual rays of light beam 28 that contact the "off" pixels of imager 16 reflect off imager 16 with their polarizations unchanged (i.e., retain s-polarization). In contrast, the individual rays of light beam 28 that contact the "on" pixels of imager 16 reflect off imager 16 with their polarizations rotated (i.e., rotated from s-polarization to p-polarization). As a result, imager 16 may rotate the polarization of the individual rays of light beam 28 based on pixel settings, which are controlled to create a desired projected image.

Projection lens 18 can be disposed adjacent curved outer surface 42 of output prism 32, such that it collects the rays of light beam 28 received from PBS 14 for transmission to the viewing screen as output light beam 28'. While only illustrated with a single projection lens, system 10 may include additional imaging optics as needed. However, curved outer surfaces 38 and 42 each function as a lens integrated in PBS 14. This reduces the number of additional imaging optics that may be needed to direct the rays of light beam 28, which correspondingly decreases the required size of system 10.

During use of system 10, illumination source 12 emits light beam 28 toward PBS 14. As discussed above, prior to entering PBS 14, light beam 28 is typically unpolarized and contains both s-polarized light rays (light rays $28_S$) and p-polarized light rays (light rays $28_{P1}$). Light beam 28 enters PBS 14 by passing through outer surface 36, and travels toward polarizing film 34.

Prior to contacting polarizing film 34, light beam 28 passes through incident surface 40 of input prism 30. Polarizing film 34 then reflects light rays $28_S$ toward curved outer surface 38 of input prism 30, and transmits light rays $28_{P1}$ into output prism 32. Light rays $28_{P1}$ enter output prism 32 through incident surface 46 and travel toward base outer surface 42. Light rays $28_{P1}$ then exit output prism 32 through the additional outer surface 44 of output prism 32 and may be discarded or recycled (e.g., redirected back toward outer surface 62).

Light rays $28_S$ exit PBS 14 by passing through curved outer surface 38. As discussed above, curved outer surface 38 can be a convex refractive surface that functions as a lens. Therefore, light rays $28_S$ are redirected when passing through curved outer surface 38. After exiting input prism 30, light rays $28_S$ contact and reflect off imager 16. The individual light rays $28_S$ that contact pixels of imager 16 in the "off" state retain their s-polarization upon reflection. However, the individual light rays $28_S$ that contact pixels of imager 16 in the "on" state have their polarizations rotated from s-polarization to p-polarization upon reflection. As a result, the reflected light beam 28 includes light rays $28_S$ and p-polarized light rays (light rays $28_{P2}$).

Light rays $28_S$ and $28_{P2}$ reflected from imager 16 are directed back toward input prism 30, and re-enter input prism 30 through curved outer surface 38. Curved outer surface 38 redirects light rays $28_S$ and $28_{P2}$ as they travel toward polarizing film 34. Light rays $28_S$ and $28_{P2}$ then pass through incident surface 40 of input prism 30 and contact polarizing film 34. Polarizing film 34 then reflects light rays $28_S$ toward the outer surface 36 of input prism 30, and transmits light rays $28_{P2}$ into output prism 32. Light rays $28_S$ then exit input prism 30 through the outer surface 36 and travel toward illumination source 12. In one embodiment of the present disclosure, light rays $28_S$ that are directed back toward illumination source 12 may be reflected back into input prism 30 (via a reflective surface in illumination source 12) to be reused. Because light rays $28_S$ are s-polarized, substantially all of light rays $28_S$ that are reused will be reflected from polarizing film 34 toward imager 16. This conserves power required to operate system 10.

After transmitting through polarizing film 34, light rays $28_{P2}$ enter output prism 44 through incident surface 46. Light rays $28_{P2}$ then exit output prism 32 through curved outer surface 42. Curved outer surface 42, shown as a concave refractive surface in FIG. 1, also functions as a lens and redirects light rays $28_{P2}$ as they travel toward projection lens 18. Projection lens 18 then collects light rays $28_{P2}$ and directs the output light beam 28' toward the viewing screen with the desired projected image. As discussed above, additional imaging optics may be used to redirect light rays $28_{P2}$, as needed. However, curved outer surfaces 38 and 42 of PBS 14 function as lenses (or, generally, as refractive surfaces having optical power) to reduce the number of additional imaging optics required.

Figure 2:
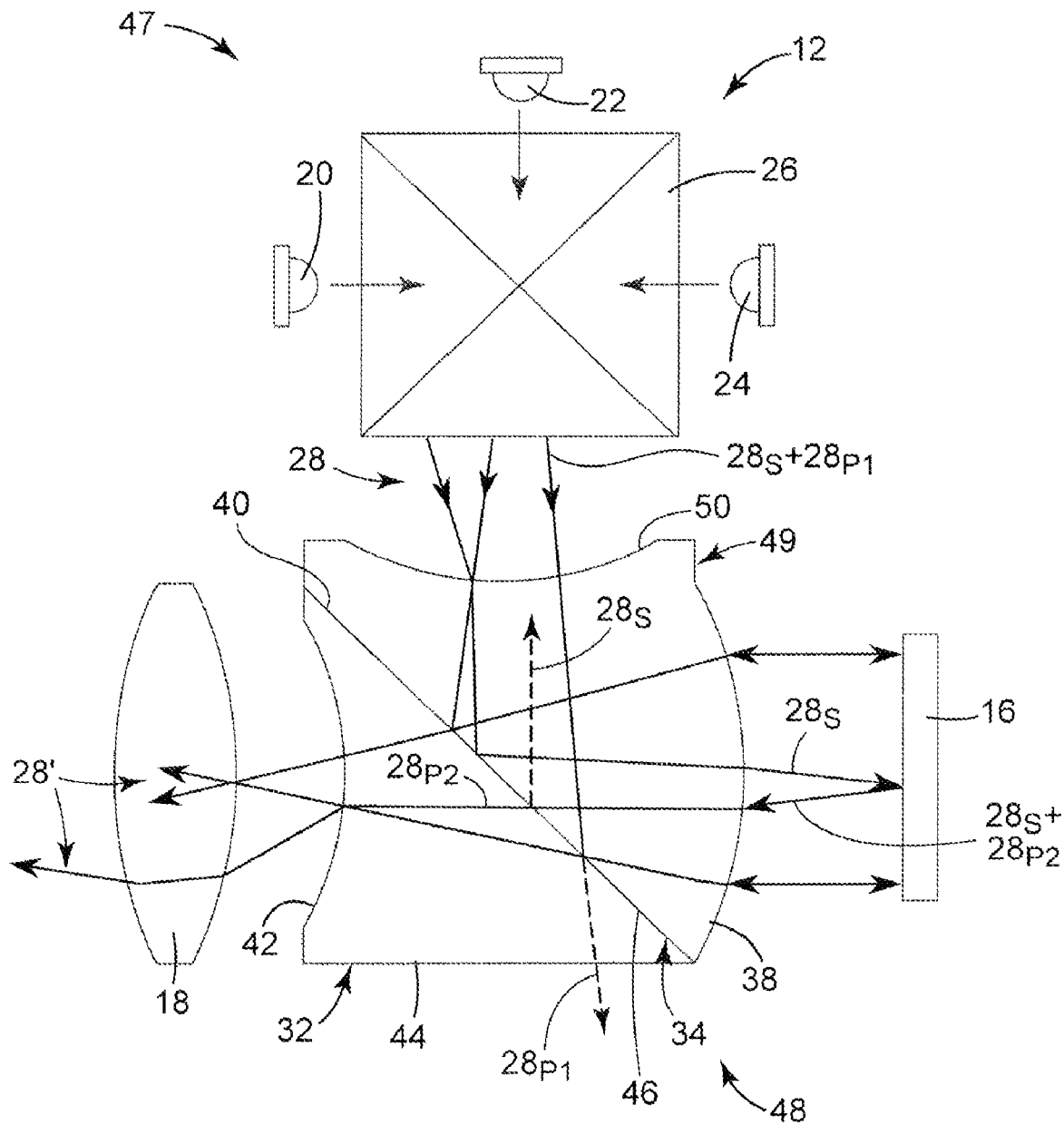
FIG. 2 is a schematic illustration of an image display system, which includes another exemplary embodiment of the reflective PBS of the present disclosure.

FIG. 2 is a schematic illustration of an optical system 47, which is an image display system similar to system 10, discussed above. System 47 includes illumination source 12, imager 16, projection lens 18, and PBS 48, where PBS 48 interacts with illumination source 12, imager 16, and projection lens 18 in a similar manner to PBS 14 shown in FIG. 1. PBS 48 is a reflective PBS that includes a first prism, here, an input prism 49 having a second curved outer surface 50 in place of (planar) additional outer surface 36 and a second prism, here output prism 32. In that configuration, the outer curved surface 42 may be referred to as a third curved outer surface of output prism 32.

Curved outer surface 50 is also a refractive surface having optical power, exemplified in FIG. 2 as a concave surface that functions as a lens in a similar manner to curved outer surfaces 38 and 42. Accordingly, the second curved outer surface 50 of input prism 49 redirects the rays of light beam 28 that transmit through curved outer surface 50 from illumination source 12. The redirected rays of light beam 28 at curved outer surface 50 correspondingly adjust the directions of the rays of light beam 28 through system 10. This is illustrated by a comparison of the rays of light beam 28 in FIGS. 1 and 2.

The curvatures and placements of curved outer surface 50 relative to illumination source 12 and polarizing film 34 may also be predetermined for redirecting the rays of light beam 28. The use of curved outer surface 50 having optical power provides additional control over the directions of the rays of light beam 28, and may further reduce the number of additional imaging optics, which may be needed to focus light 28, thereby reducing the size of system 47.

Figure 3:
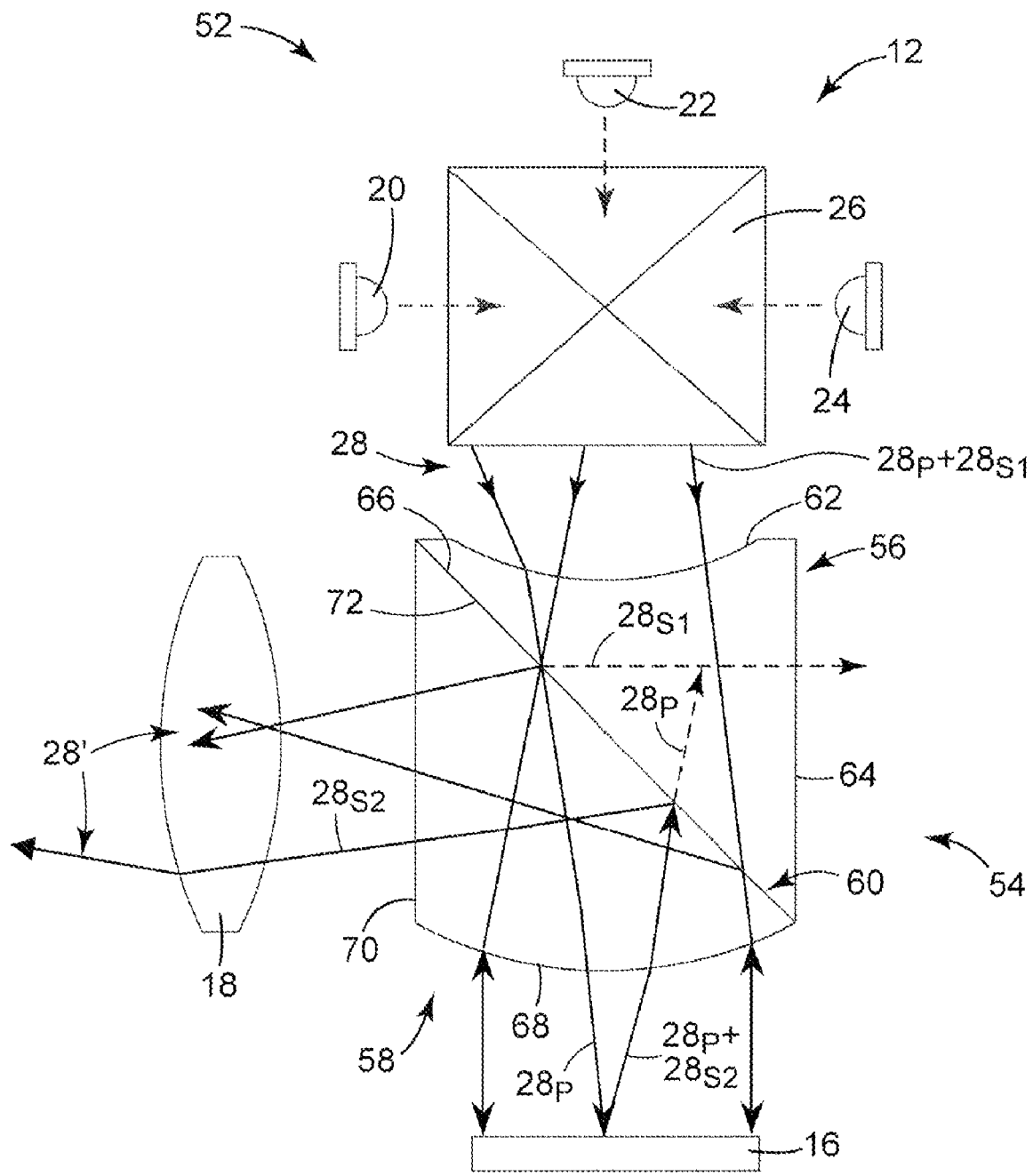
FIG. 3 is a schematic illustration of an image display system, which includes an exemplary transmissive PBS of the present disclosure.

FIG. 3 is a schematic illustration of an optical system 52, which is also an image display system similar to systems 10 and 47, discussed above. System 52 includes illumination source 12, imager 16, projection lens 18, and another exemplary PBS 54 of the present disclosure. PBS 54 of the present disclosure is a transmissive PBS that also is capable of reducing the number of imaging optics required to direction light to a viewing screen (not shown).

PBS 54 includes a first prism, here, output prism 58, a second prism, here, input prism 56, and reflective polarizing film 60. Input prism 56 and output prism 58 are low-birefringence, polymeric prisms disposed adjacent each other on opposing sides of reflective polarizing film 60. Because the exemplary PBS 54 is a transmissive PBS, the rays of light beam 28 used to form the projected image are shown transmitting through an outer surface 62 of input prism 56 and through two outer surfaces 68, 70 of output prism 58. This is in contrast to the exemplary PBS 14 discussed above in FIG. 1, which is a reflective PBS, and is shown with the rays of light beam 28 used to form the projected image passing through two outer surfaces of input prism 30 and through one outer surface of output prism 32.

Input prism 56 includes a second curved outer surface 62, additional outer surface 64, and incident surface 66. Similarly, output prism 58 includes a first curved outer surface 68, additional outer surface 70, and incident surface 72. As shown in FIG. 3, curved outer surface 62 can be a concave surface and curved outer surface 68 can be a convex surface. Curved outer surfaces 62 and 68 function as lenses (and, generally, as refractive surfaces having optical power) that are integrated into PBS 54, and redirect the rays of light beam 28 that are transmitted through them, thereby reducing the need for additional imaging optics. The curvatures and placements of curved outer surfaces 62 and 68 relative to illumination source 12, polarizing film 60, projection lens 18, and the viewing screen may be predetermined for directing light beam 28 in a desired way.

Reflective polarizing film 60 may be a polymeric reflective polarizing film that is secured between incident surfaces 66 and 72 of input prism 56 and output prism 58, respectively. Examples of suitable films for polarizing film 60 include the films discussed above for polarizing film 34. Polarizing film 60 also splits light beam 28 received from illumination source 12 into reflected polarization components (s-polarized light rays) and transmitted polarization components (p-polarized light rays).

During use of system 52, illumination source 12 emits light beam 28 toward PBS 54. Prior to entering PBS 54, light beam 28 is unpolarized and contains both s-polarized light rays (light rays $28_{S1}$) and p-polarized light rays (light rays $28_P$). Light beam 28 enters PBS 54 by passing through curved outer surface 62, which redirects light rays $28_{S1}$ and $28_P$ due to the surface curvature. Light beam 28 then passes through incident surface 66 of input prism 56 and contacts polarizing film 60. Polarizing film 60 then reflects light rays $28_{S1}$ toward additional outer surface 64 of input prism 56, and transmits light rays $28_P$ into output prism 68. Light rays $28_{S1}$ pass back into input prism 56 through incident surface 66 and travel toward additional outer surface 64. Light rays $28_{S1}$ then exit input prism 56 through additional outer surface 64 and may be discarded or recycled (e.g., redirected back toward second curved outer surface 62).

After transmitting through polarizing film 60, light rays $28_P$ enter output prism 58 through incident surface 72, and travel toward curved outer surface 68. Light rays $28_P$ exit PBS 54 by passing through curved outer surface 68, which redirects light rays $28_P$. After exiting output prism 58, light rays $28_P$ contact and reflect off imager 16. The individual light rays $28_P$ that contact pixels of imager 16 in the "off" state retain their p-polarization upon reflection. However, the individual light rays $28_P$ that contact pixels of imager 16 in the "on" state have their polarizations rotated from p-polarization to s-polarization upon reflection. As a result, the reflected light includes light rays $28_P$ and s-polarized light rays (light rays $28_{S2}$).

Light rays $28_P$ and $28_{S2}$ reflected from imager 16 are directed back toward output prism 58, and re-enter output prism 58 through curved outer surface 68. Curved outer surface 68 redirects light rays $28_P$ and $28_{S2}$ as they travel toward polarizing film 60. Light rays $28_P$ and $28_{S2}$ then pass through incident surface 72 of output prism 58 and contact polarizing film 60. Polarizing film 60 then reflects light rays $28_{S2}$ toward additional outer surface 70 of output prism 58, and transmits light rays $28_P$ into input prism 56.

Light rays $28_P$ pass back into input prism 56 through incident surface 66 and travel toward curved outer surface 62. Light rays $28_P$ then exit input prism 56 through curved outer surface 62 (which again redirects light rays $28_P$) and travel toward illumination source 12. In one embodiment of the present disclosure, light rays $28_P$ that are directed back toward illumination source 12 may be reflected back into input prism 56 (via a reflective surface in illumination source 12) to be reused. Because light rays $28_P$ are p-polarized, substantially all of light rays $28_P$ reused will transmit through polarizing film 60 toward imager 16. This conserves power required to operate system 52.

Light rays $28_{S2}$ that reflect off of polarizing film 60 re-enter output prism 58 through incident surface 72 and travel toward additional outer surface 70. Light rays $28_{S2}$ then exit output prism 58 through additional outer surface 70, and travel toward projection lens 18. Projection lens 18 then collects and directs light rays $28_{S2}$ so that output light beam 28' propagates toward a viewing screen or a viewer with the desired projected image. Accordingly, curved outer surfaces 62 and 68 of PBS 54 function as integrated projection lenses that reduce the number of additional imaging optics required for system 52.

Figure 4:
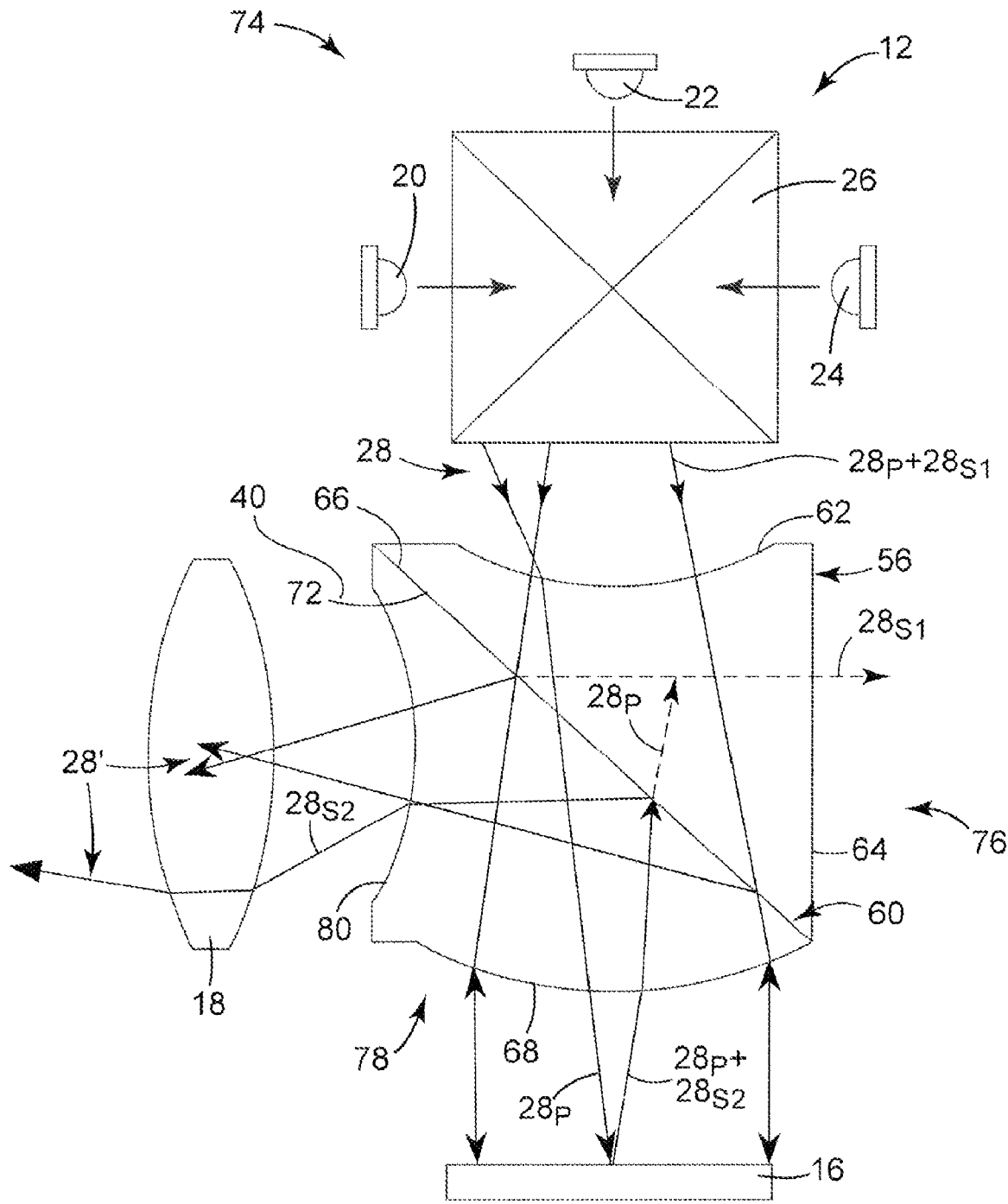
FIG. 4 is a schematic illustration of an image display system, which includes another exemplary embodiment of the transmissive PBS of the present disclosure.

FIG. 4 is a schematic illustration of an optical system 74, which is an image display system similar to system 52, discussed above in connection with FIG. 3. System 74 includes illumination source 12, imager 16, projection lens 18, and PBS 76, where PBS 76 interacts with illumination source 12, imager 16, and projection lens 18 in a manner similar to PBS 54 of system 52. PBS 76 is a transmissive PBS that includes a first prism, here, output prism 78, having a second curved outer surface 80 in place of (planar) additional surface 70 and a first curved outer surface 68. The PBS 76 further includes a second prism, here, the input prism 56. In that configuration, the outer curved surface 62 may be referred to as a third curved outer surface of input prism 56.

Curved outer surface 80 is exemplified as a concave surface that functions as a lens in a similar manner to curved outer surfaces 62 and 68. Accordingly, curved outer surface 80 redirects the light rays $28_{S2}$ that transmit through curved outer surface 80. This redirects where light rays $28_{S2}$ contact projection lens 18, as is illustrated by a comparison of light rays $28_{S2}$ in FIGS. 3 and 4.

The curvatures and placements of curved outer surface 80 relative to projection lens 18 and polarizing film 60 may also be predetermined to accurately redirect light beam 28. The use of curved outer surface 80 provides additional control over the directions of the rays of light beam 28, and may further reduce the number of additional imaging optics required to direct light beam 28, thereby reducing the size of system 74.

Figure 5:
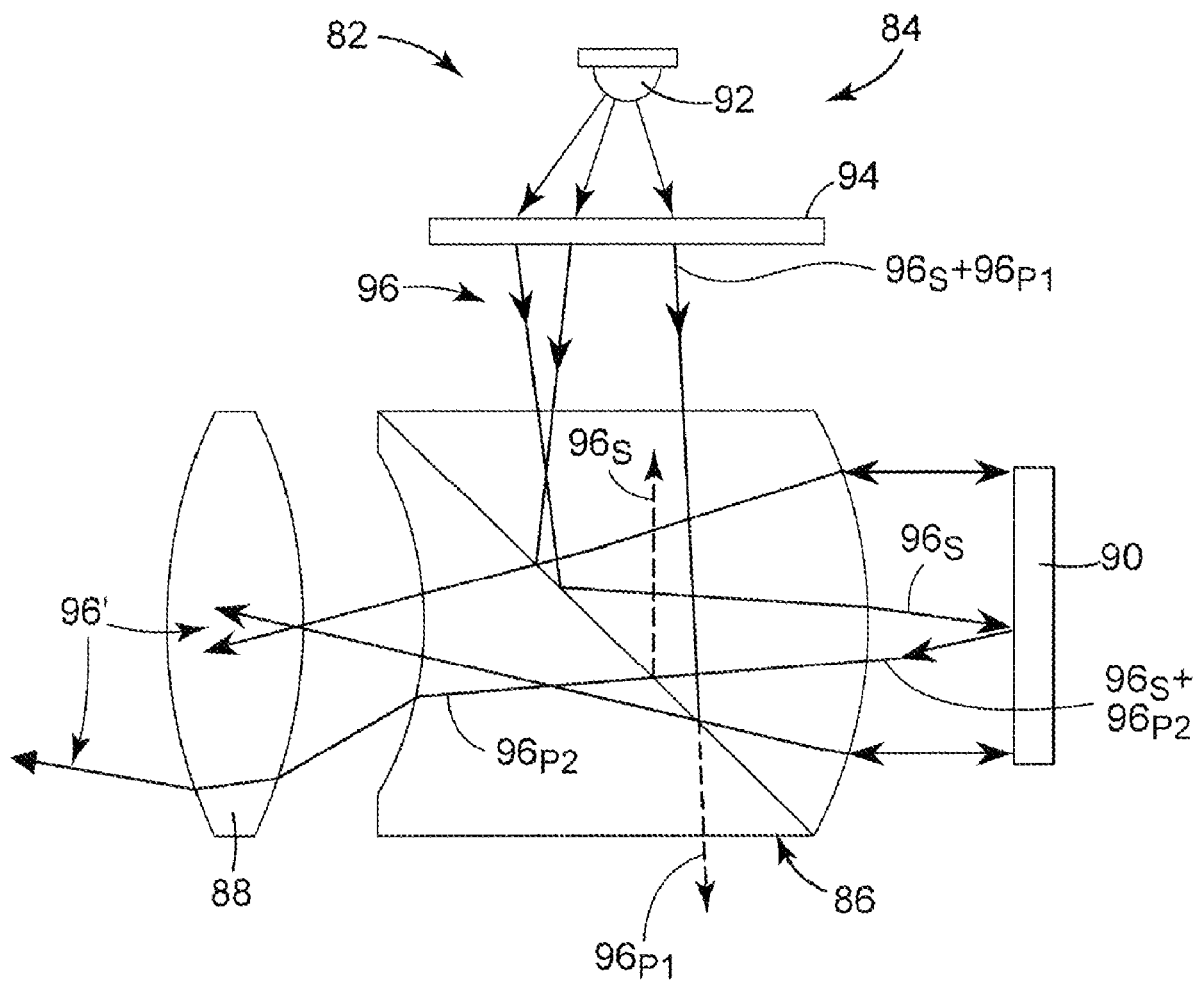
FIG. 5 is a schematic illustration of an image display system, which includes another exemplary embodiment of the reflective PBS of the present disclosure in use with alternative illumination source.

FIG. 5 is a schematic illustration of optical system 82, which may be an image display system similar to system 10, shown above in FIG. 1. System 82 includes illumination source 84, PBS 86, projection lens 88, and imager 90. Illumination source 84 includes one or more LEDs 92 and focus lens 94, where LED 92 emits light beam 96 as rays of white light (i.e., multiple wavelengths of the visual spectrum) toward focus lens 94. Focus lens 94 is a lens for focusing the rays of light beam 96 toward PBS 86. PBS 86 and projection lens 88 may be the same components as PBS 14 and projection lens 18 (shown in FIG. 1 and described above) and function in the same manner. Accordingly, PBS 86 splits light beam 96 into reflected polarization components (s-polarized light rays) and transmitted polarization components (p-polarized light rays).

Imager 90 is a polarization-rotating component, similar to imager 16 shown above in FIG. 1. However, imager 90 also includes color filters (not shown) for filtering the color wavelengths of the reflected rays of light beam 96. This imparts color components to the reflected rays of light beam 96. As a result, system 82 provides an alternative arrangement to provide a colored image compared to the three-component light source of illumination source 12 (shown in FIG. 1). While system 82 is arranged in the same general manner as system 10, illumination source 84 and imager 90 are suitable for use with any of the systems disclosed herein (e.g., systems 47, 52, and 74). The use of a single LED illumination source further reduces the number of components required for projecting a colored image, thereby allowing system 82 to be used in compact devices.

Figure 6:
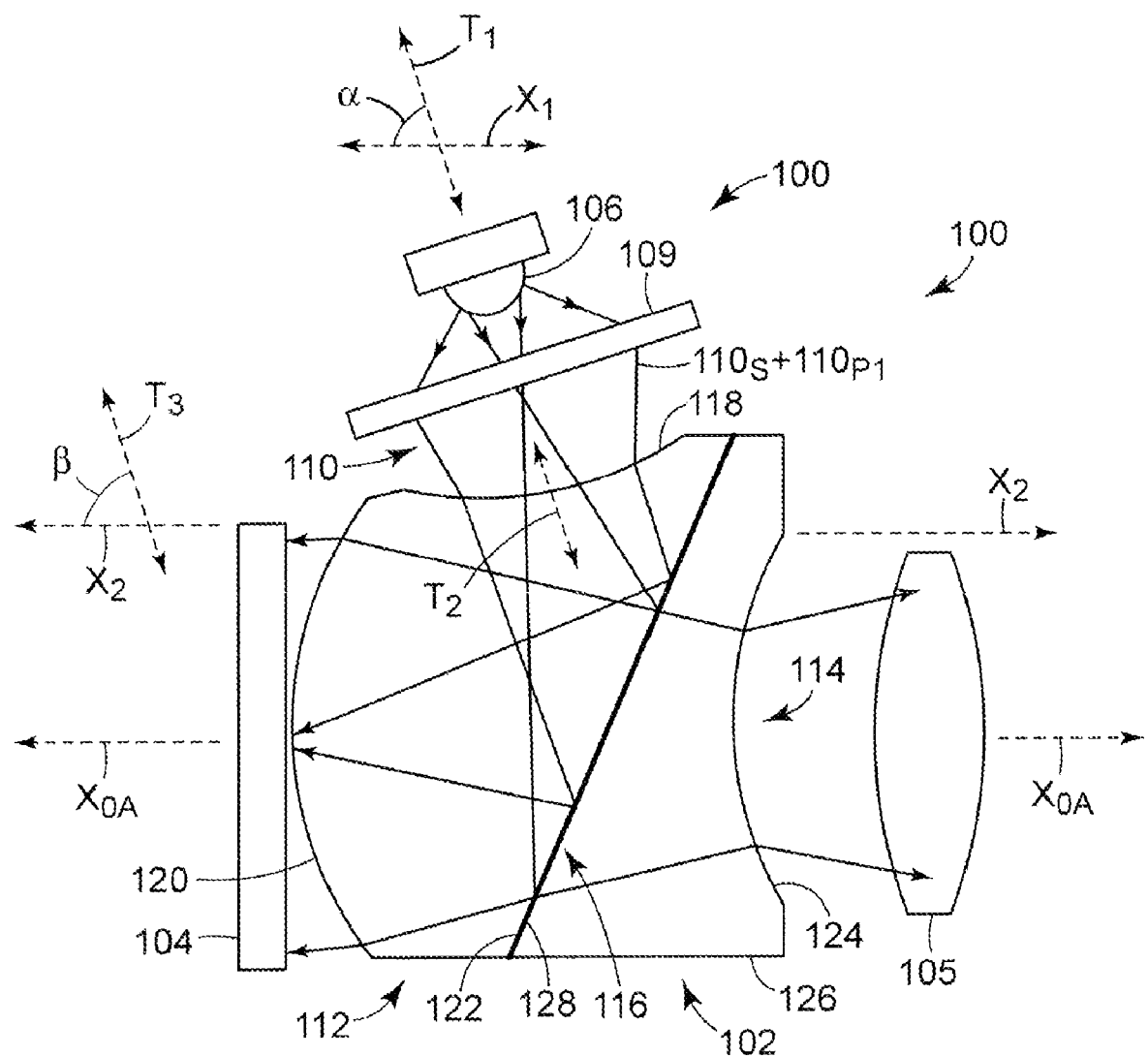
FIG. 6 is a schematic illustration of an image display system, which includes another exemplary embodiment of the reflective PBS of the present disclosure that has a decentered surface.

FIG. 6 is a schematic illustration of optical system 98, which is an image display system generally similar to system 47, shown above in FIG. 2. As shown in FIG. 6, system 98 includes illumination source 100, PBS 102, imager 104, and projection lens 105. Illumination source 100 includes LED 106 and focus lens 109, which function in the same manner as discussed above for illumination source 84 (shown in FIG. 5) for emitting light beam 110 as rays of white light. In an alternative embodiment, illumination source 100 is replaced with a three-component light source (e.g., illumination source 12).

PBS 102 functions in a similar manner to PBS 48 (shown in FIG. 2) and includes input prism 112, output prism 114, and reflective polarizing film 116. Input prism 112 and output prism 114 are preferably low-birefringence, polymeric prisms disposed adjacent each other on opposing sides of reflective polarizing film 116. Input prism 112 includes curved outer surfaces 118 and 120, and incident surface 122. Similarly, output prism 114 includes curved outer surface 124, outer surface 126, and incident surface 128.

As shown in this exemplary embodiment, curved outer surfaces 118 and 124 are concave surfaces, and curved outer surface 120 is a convex surface. Curved outer surfaces 118, 120, and 124 function as lenses that are integrated into PBS 102, and redirect the rays of light beam 110 that are transmitted through them, thereby reducing the need for additional imaging optics.

Additionally, illumination source 100 is disposed such that its principal ray (which extends along axis $T_1$) is oriented at a tilted angle α relative to axis $X_1$, where axis $X_1$ is parallel to an optical axis of curved outer surface 124 and projection lens 105 (referred to herein as optical axis $X_{OA}$). The tilted orientation of illumination source 100 allows for a more compact arrangement, thereby further reducing the size of system 98. Examples of suitable angles for titled angle α range from about 45 degrees to about 90 degrees, where 90 degrees corresponds to the orientations shown in FIGS. 1-5 (i.e., normal to axis $X_{OA}$).

Furthermore, curved outer surface 118 is disposed such that its optical axis (referred to herein as optical axis $T_2$, and which extends parallel to axis $T_3$) is oriented at a tilted angle β relative to axis $X_2$, where axis $X_2$ is also parallel to optical axis $X_{OA}$ (and to axis $X_1$). This allows first curved outer surface 118 to receive the rays of light beam 110 from illumination source 100 while illumination source 100 is oriented at tilted angle α. Examples of suitable angles for titled angle β range from about 45 degrees to about 90 degrees, where 90 degrees corresponds to the orientations shown in FIGS. 1-5 (i.e., normal to axis $X_{OA}$). When curved outer surface 118 is oriented at titled angle β, where titled angle β is less than 90 degrees, curved outer surface 118 is referred to as a "decentered surface".

Reflective polarizing film 116 is a polymeric reflective polarizing film that is secured between incident surfaces 122 and 128 of input prism 112 and output prism 114, respectively. Examples of suitable films for polarizing film 116 include the films discussed above for polarizing film 34 (shown in FIG. 1). Polarizing film 116 splits light beam 110 received from illumination source 100 into reflected polarization components (s-polarized light rays) and transmitted polarization components (p-polarized light rays).

Imager 104 and projection lens 105 are generally similar to imager 16 and projection lens 18 (shown in FIG. 1 and described above) and function in similar manners. System 98 may be used in the same manner as system 47 (shown above in FIG. 2) where the orientations of illumination source 100 and first curved outer surface 118 (i.e., tilted angles α and β) may also be predetermined for directing the rays of light beam 110. This allows the size of system 98 to be further reduced for use in compact devices.

Figure 7:
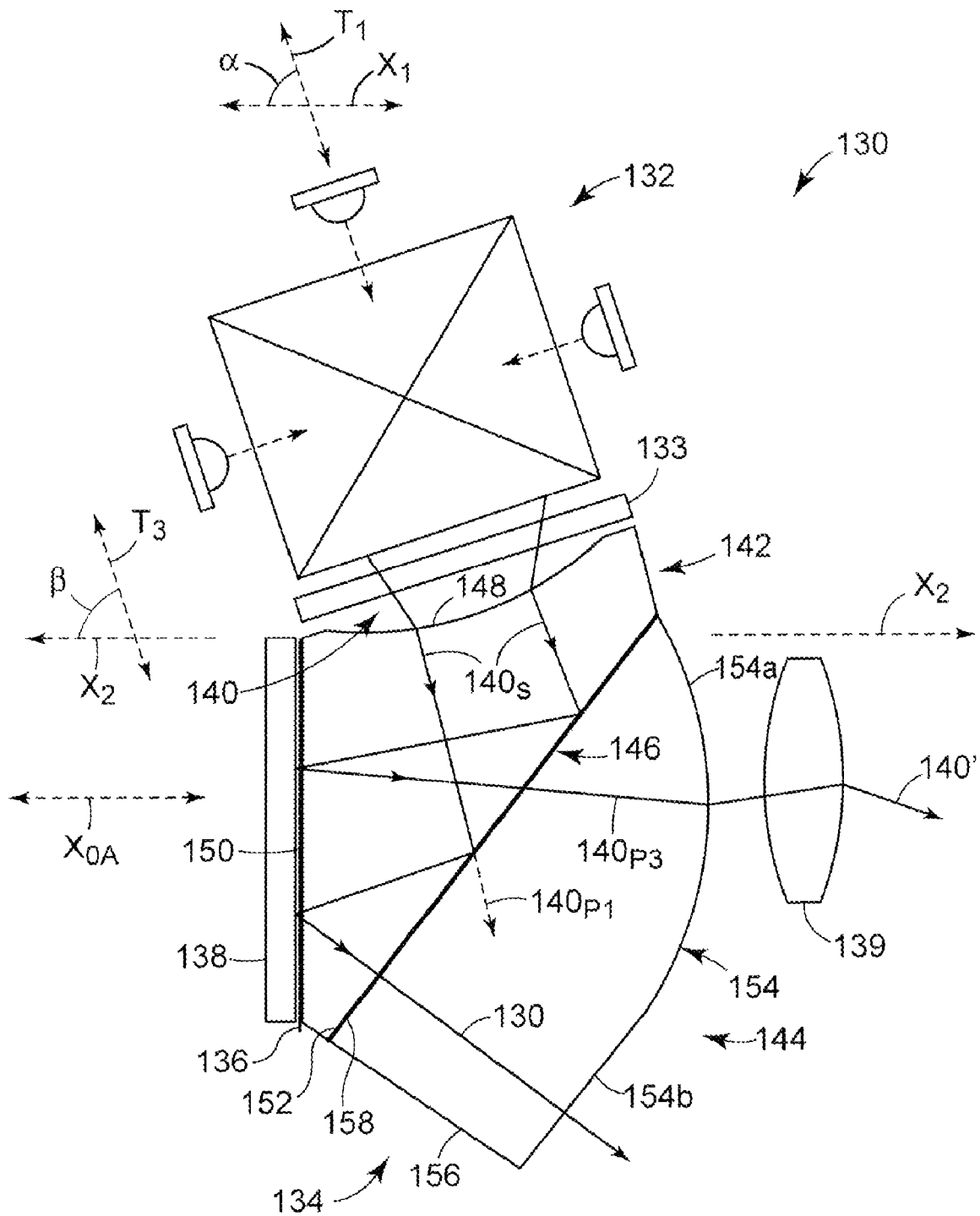
FIG. 7 is a schematic illustration of an image display system, which includes another exemplary embodiment of the reflective PBS of the present disclosure that has a decentered surface and is in use with a digital-mirror device.

FIG. 7 is a schematic illustration of optical system 130, which is an image display system similar to system 98 (shown in FIG. 6), but includes a digital-mirror device in lieu of a polarization-rotating imager. As shown in FIG. 7, system 130 includes illumination source 132, pre-polarizing film 133, PBS 134, quarter-wave plate 136, imager 138, and projection lens 139. Illumination source 132 is a three-component light source similar to illumination source 12 (shown in FIG. 1) for emitting light beam 140. In this embodiment, illumination source 132 is also oriented at tilted angle α relative to axis $X_1$ (and optical axis $X_{OA}$), thereby further reducing the size of system 132. In an alternative embodiment, illumination source 132 may be replaced with a combination of a white LED and color filters (not shown), as discussed above with respect to FIG. 5.

Pre-polarizing film 133 is an absorptive or reflective polarizing film that polarizes the rays of light beam 140 in the s-polarization state. As shown, pre-polarizing film 133 is also disposed at tilted angle αx for receiving light beam 140. Examples of suitable films for pre-polarizing film 133 include any type of absorptive or reflective polarizing film, such as those discussed above for polarizing film 34 (shown in FIG. 1 and described above). In alternative embodiments, light beam 140 is emitted from a polarized source (e.g., polarized LEDs and laser systems). In these embodiments, pre-polarizing film 133 may be omitted to reduce the number of components for system 130.

PBS 134 includes input prism 142, output prism 144, and reflective polarizing film 146. Input prism 142 and output prism 144 are low-birefringence, polymeric prisms disposed adjacent each other on opposing sides of reflective polarizing film 146. Input prism 142 includes curved outer surface 148, outer surface 150, and incident surface 152. Similarly, output prism 144 includes curved outer surface 154, outer surface 156, and incident surface 158.

As shown in FIG. 7, curved outer surface 148 is a concave surface, and curved outer surface 154 is a convex surface. Curved outer surfaces 148 and 154 function as lenses that are integrated into PBS 134, and redirect the rays of light beam 140 that are transmitted through them, thereby reducing the need for additional imaging optics. In addition, first curved outer surface 148 is decentered, thereby being oriented at tilted angle β relative to axis $X_2$ (and optical axis $X_{OA}$). This allows first curved outer surface 148 to receive the rays of light beam 140 from illumination source 132 while illumination source 132 is oriented at tilted angle α.

Second curved outer surface 154 includes first portion 154a and second portion 154b, where first portion 154a faces projection lens 139 and second portion 154b faces a light-absorbing component (not shown). In one embodiment, second portion 154b is laminated with a light absorbing film (not shown) that absorbs the light rays of light beam 140 that transmit through second portion 154b. Alternatively, the light-absorbing component is located adjacent to, but not in contact with, PBS 134, thereby reducing heat build up on PBS 134 by the absorbed light rays.

Reflective polarizing film 146 is a polymeric reflective polarizing film that is secured between incident surfaces 152 and 158 of input prism 142 and output prism 144, respectively. Reflective polarizing film 146 reflects s-polarization components of light beam 140 (light rays $140_S$) and transmits p-polarization components of light beam 140 (light rays $140_{P1}$). Examples of suitable films for polarizing film 146 include the films discussed above for polarizing film 34.

Quarter-wave plate 136 is a polarization-rotating film that rotates the polarization of a ray of light beam 140 by about a quarter of a polarization state per pass. Imager 138 is a digital-mirror device, which contains a grid of microscopic mirror cells, each of which may be selectively activated. Examples of suitable digital-mirror devices are commercially available under the trade designation "DIGITAL LIGHT PROCESSING" mirrors from Texas Instruments Inc., Plano Tex. Imager 138 reflects rays of light beam 140 in a direction based on whether the mirror cells of imager 138 are "on" or "off". The individual rays of light beam 140 that contact the "off" mirror cells of imager 138 are reflected toward second portion 154b of second curved outer surface 154 (referred to as light rays $140_{P2}$). As such, light rays $140_{P2}$ are absorbed by the light-absorbing component.

In contrast, the individual rays of light beam 140 that contact the "on" pixels of imager 138 are reflected toward first portion 154a of second curved outer surface 154 (referred to as light rays $140_{P3}$). As such, light rays $140_{P3}$ are reflected toward projection lens 139. Gray levels are obtained by angularly modulating given mirror cells between "on" and "off" states. Accordingly, imager 138 may transmit one or more of the individual rays of light beam 140 based on the mirror cell settings, which are controlled to create a desired projected image in a similar manner as the pixel settings of polarization-rotating imagers (e.g., imager 16).

Projection lens 139 is similar to projection lens 18 (shown in FIG. 1) and functions in the same manner. During use of system 130, illumination source 132 emits light beam 140 toward pre-polarizing film 133. Pre-polarizing film 133 absorbs or reflects the p-polarization components of light beam 140 and transmits the s-polarization components of light beam 140 (i.e., light rays $140_S$) toward PBS 134. Light rays $140_S$ enter input prism 142 by passing through curved outer surface 148, which redirects light rays $140_S$ due to the surface curvature.

Light beam 140 then passes through incident surface 152 of input prism 142 and contacts polarizing film 146. Because light beam 140 was pre-polarized, substantially all of the light rays of light beam 140 are in the s-polarization state (i.e., light rays $140_S$). As a result, polarizing film 146 reflects light rays $140_S$ back into input prism 142, and transmits any residual light rays $140_{P1}$ through output prism 144, toward second portion 154b. In an alternative embodiment, pre-polarizing film 133 is omitted and polarizing film 146 splits light beam 140 into light beams $140_S$ and $140_{P1}$ in the same manner as discussed above for polarizing film 34 (shown above in FIGS. 1 and 2).

Light rays $140_S$ that reflect off of polarizing film 146 re-enter input prism 142 through incident surface 152 and travel toward outer surface 150. Light rays $140_S$ then exit input prism 142 through outer surface 150, and travel through quarter-wave plate 136. Quarter-wave plate 136 then rotates the polarization states of light rays $140_S$ by quarter of a polarization state (referred to as light rays $140_{SP}$). Light rays $140_{SP}$ then contact the mirror cells of imager 138.

The individual light rays $140_{SP}$ that contact mirror cells of imager 138 in the "off" state are reflected in the direction of second portion 154b. Such light rays $140_{SP}$ then transmit back through quarter-wave plate 136, which further rotates the polarization states of light rays $140_{SP}$ to the p-polarization state (referred to as light rays $140_{P2}$). Light rays $140_{P2}$ then transmit through input prism 142 and contact polarizing film 146. Because light rays $140_{P2}$ are in the p-polarization state, light rays $140_{P2}$ transmit through polarizing film 146 and output prism 144, and are absorbed by the light-absorbing component.

The individual light rays $140_{SP}$ that contact mirror cells of imager 138 in the "on" state, however, are reflected in the direction of first portion 154a. Such light rays $140_{SP}$ then transmit back through quarter-wave plate 136, which further rotates the polarization states of light rays $140_{SP}$ to the p-polarization state (referred to as light rays $140_{P3}$). Light rays $140_{P3}$ then transmit through input prism 142 and contact polarizing film 146. Because light rays $140_{P3}$ are also in the p-polarization state, light rays $140_{P3}$ also transmit through polarizing film 146 and enter output prism 144 through incident surface 158.

Light rays $140_{P3}$ then exit output prism 144 through curved outer surface 154 (at first portion 154a). Curved outer surface 154 redirects light rays $140_{P3}$ as they travel toward projection lens 139. Projection lens 139 then collects light rays $140_{P3}$ and directs the output light beam 140' toward the viewing screen (not shown) with the desired projected image. The use of curved outer surfaces 148 and 154 of PBS 134 accordingly reduces the number of additional imaging optics required for system 130. Furthermore, imager 138 allows system 130 to use a reflection-based arrangement as an alternative to total-internal reflection (TIR) prisms, which are expensive and typically introduce astigmatism characteristics.

Figure 8:
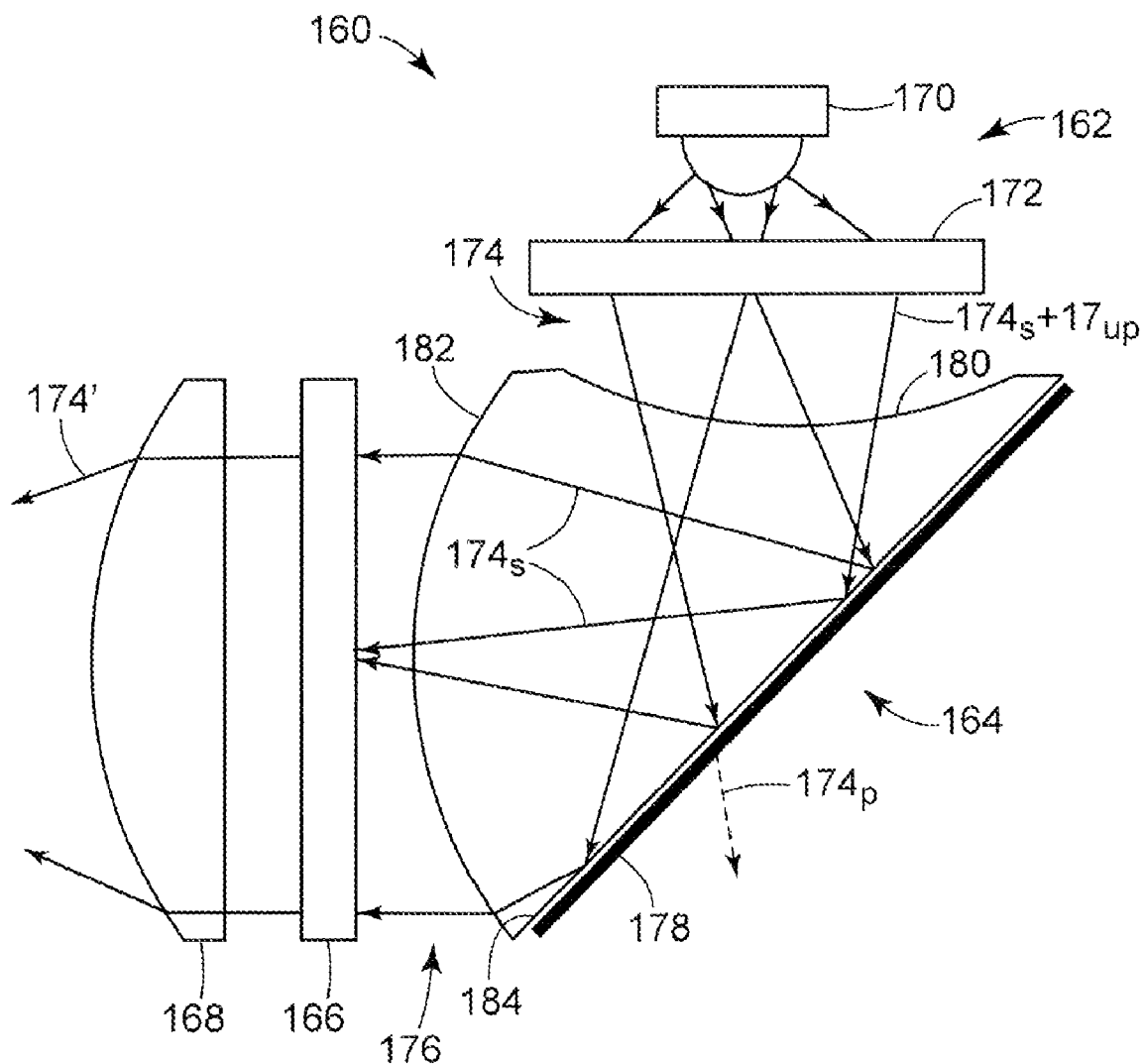
FIG. 8 is a schematic illustration of an image display system, which includes another exemplary embodiment of the reflective PBS of the present disclosure that uses a single prism.

FIG. 8 is a schematic illustration of optical system 160, which is an image display system similar to system 82 (shown in FIG. 5), but which includes a single PBS prism. As shown in FIG. 8, system 160 includes illumination source 162, PBS 164, imager 166, and projection lens 168. Illumination source 162 includes LED 170 and focus lens 172, which function in the same manner as discussed above for illumination source 84 and focus lens 86 (shown in FIG. 5 and described above) for emitting light beam 174 as rays of white light toward PBS 164. In an alternative embodiment, illumination source 162 is oriented at tilted angle α, as discussed above for illumination source 100 in FIG. 6. In another alternative embodiment, illumination source 162 includes a three-component light source similar to illumination source 12 (shown in FIG. 1).

PBS 164 includes prism 176 and reflective polarizing film 178. Prism 178 is a low-birefringence, polymeric prism, which includes curved outer surfaces 180 and 182, and incident surface 184. As shown in FIG. 8, curved outer surface 180 is a concave surface and curved outer surface 182 is a convex surface. Curved outer surfaces 180 and 182 function as lenses that are integrated into PBS 164, and redirect the rays of light beam 174 that are transmitted through them, thereby reducing the need for additional imaging optics. The curvatures and placements of curved outer surfaces 180 and 182 relative to illumination source 162, imager 166, polarizing film 178, and a viewing screen (not shown) may be pre-determined for directing light beam 174 in a desired way. In an alternative embodiment, curved outer surface 180 is oriented at tilted angle β, as discussed above for curved outer surface 118 in FIG. 6.

Reflective polarizing film 178 is a polymeric reflective polarizing film that is secured adjacent incident surface 184 of prism 176. Examples of suitable films for polarizing film 178 include the films discussed above for polarizing film 34 (shown in FIG. 1). Polarizing film 178 splits light beam 174 received from illumination source 162 into reflected polarization components (s-polarized light rays) and transmitted polarization components (p-polarized light rays).

Imager 166 is a pixilated-imaging component, such as a transmissive LCD, HTPS, or a microelectromechanical system (MEMS) imager, which is disposed adjacent curved outer surface 182 of prism 176. Imager 166 also includes color filters (not shown) for filtering the wavelengths of the reflected rays of light beam 174, thereby imparting color components to the reflected rays of lights beam 174. Imager 166 transmits rays of light beam 174 based on the whether the pixels of imager 166 are "on" or "off". The individual rays of light beam 174 that contact the "off" pixels of imager 166 are blocked by imager 166. In contrast, the individual rays of light beam 174 that contact the "on" pixels of imager 166 transmit through imager 166 toward projection lens 168. As a result, imager 166 may transmit one or more of the individual rays of light beam 174 based on pixel settings, which are controlled to create a desired projected image. Projection lens 168 is disposed adjacent imager 166 such that projection lens 168 collects the rays of light beam 174 received from imager 166 for transmission to the viewing screen as output light beam 174'.

During use of system 160, illumination source 170 emits light beam 174 toward PBS 164. Prior to entering PBS 164, light beam 174 is unpolarized and contains both s-polarized light rays (light rays $174_S$) and p-polarized light rays (light rays $174_P$). Light beam 174 enters prism 176 by passing through curved outer surface 180, which redirects light rays $174_S$ and $174_P$ due to the surface curvature. Light beam 174 then passes through incident surface 184 of prism 176 and contacts polarizing film 178. Polarizing film 178 then reflects light rays $174_S$ back into prism 176, and transmits light rays $174_P$ beyond PBS 164 to be discarded or recycled.

Light rays $174_S$ that reflect off of polarizing film 178 re-enter prism 176 through incident surface 184 and travel toward curved outer surface 182. Light rays $174_S$ then exit prism 176 through curved outer surface 182, which redirects light rays $174_S$ due to the surface curvature, and travel toward imager 166. The individual light rays $174_S$ that contact pixels of imager 166 in the "off" state are blocked by imager 166. However, the individual light rays $174_S$ that contact pixels of imager 166 in the "on" state transmit through imager 166 toward projection lens 168. Projection lens 168 then collects and directs light rays $174_S$ so that output light beam 174' propagates toward the viewing screen (not shown) with the desired projected image. Accordingly, curved outer surfaces 180 and 182 of PBS 164 function as integrated projection lenses that reduce the number of additional imaging optics required for system 160.

Figure 9:
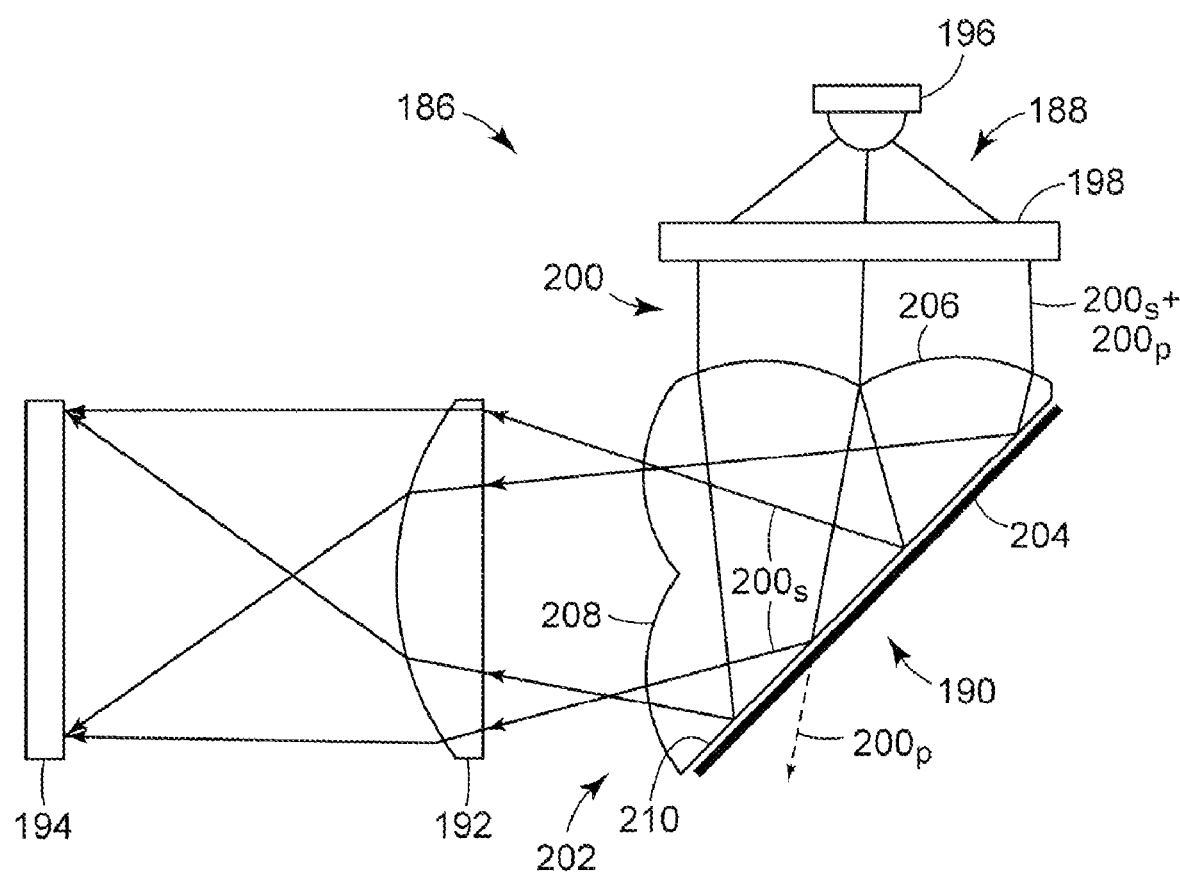
FIG. 9 is a schematic illustration of an image display system, which includes another exemplary embodiment of the reflective PBS of the present disclosure that uses a single homogenizing prism.

FIG. 9 is a schematic illustration of optical system 186, which is an image display system similar to system 98 (shown in FIG. 6). As shown in FIG. 9, system 186 includes illumination source 188, PBS 190, field lens 192, and imager 194. Illumination source 188 includes LED 196 and collimation optics 198, where LED 196 functions in the same manner as discussed above for illumination source 84 (shown in FIG. 5 and discussed above) for emitting light beam 200 as rays of white light toward collimation optics 198. Collimation optics 198 receives light beam 200 from LED 196 and collimates the rays of light beam 200 as light beam 200 travels toward PBS 190.

PBS 190 includes prism 202 and reflective polarizing film 204. Prism 202 is a low-birefringence, polymeric prism, which includes curved outer surfaces 206 and 208, and incident surface 210. As shown in FIG. 9, curved outer surfaces 206 and 208 each function as a lens array integrated into PBS 190. The lens array of curved outer surfaces 206 samples the far field pattern (i.e., the profile of light beam 200 transmitted from collimation optics 198) into sub-profiles having the same aspect ratio as imager 194 (e.g., a 16:9 ratio or a 4:3 ratio). Each sub-profile of light beam 200 is then imaged through the corresponding lenses of curved outer surfaces 208. This embodiment is suitable for use with targets that require uniform illumination (e.g., projection television light engines and solar simulators). The curvatures and placements of curved outer surfaces 206 and 208 relative to illumination source 188, imager 194, polarizing film 204, and a viewing screen (not shown) may be predetermined for directing light beam 200 in a desired way.

Reflective polarizing film 204 is a polymeric reflective polarizing film that is secured adjacent incident surface 210 of prism 202. Examples of suitable films for polarizing film 204 include the films discussed above for polarizing film 34 (shown in FIG. 1). Polarizing film 204 splits light beam 200 received from illumination source 188 into reflected polarization components (s-polarized light rays) and transmitted polarization components (p-polarized light rays).

Field lens 192 is disposed adjacent PBS 190 such that field lens 192 receives the sub-profiles of light beam 200 from PBS 190, and superimposes the sub-profiles of light beam 200 onto imager 194. Imager 194 is a pixilated-imaging component disposed adjacent projection lens 192, and functions in the same manner as imager 166 (shown in FIG. 8). As such, imager 194 may transmit one or more of the individual rays of light beam 200 based on pixel settings, which are controlled to create a desired projected image.

During use of system 186, LED 196 emits light beam 200 toward collimation optics 198. Collimation optics 198 collimate the rays of light beam 200 and direct the rays toward PBS 190. Prior to entering PBS 190, light beam 200 is unpolarized and contains both s-polarized light rays (light rays $200_S$) and p-polarized light rays (light rays $200_P$). Light beam 200 enters prism 202 by passing through curved outer surface 206, where the sub-lenses of curved outer surface 206 samples the profile of light beam 200 into sub-profiles having the same aspect ratio as imager 194. Light beam 200 then passes through incident surface 210 of prism 202 and contacts polarizing film 204. Polarizing film 204 then reflects light rays $200_S$ back into prism 202, and transmits light rays $200_P$ beyond PBS 190 to be discarded or recycled.

Light rays $200_S$ that reflect off of polarizing film 204 re-enter prism 202 through incident surface 210 and travel toward curved outer surface 208. Light rays $200_S$ then exit prism 202 through the corresponding sub-lenses of curved outer surface 208. Light rays $200_S$ then travel toward field lens 192. Field lens 192 then receives and superimposes light rays $200_S$ onto imager 194. The individual light rays $200_S$ that contact pixels of imager 194 in the "on" state, transmit through imager 194 toward a viewing screen with the desired projected image. Accordingly, curved outer surfaces 206 and 208 of PBS 190 function as integrated sub-lens arrays that reduce the number of additional imaging optics required for system 186.

Figure 10:
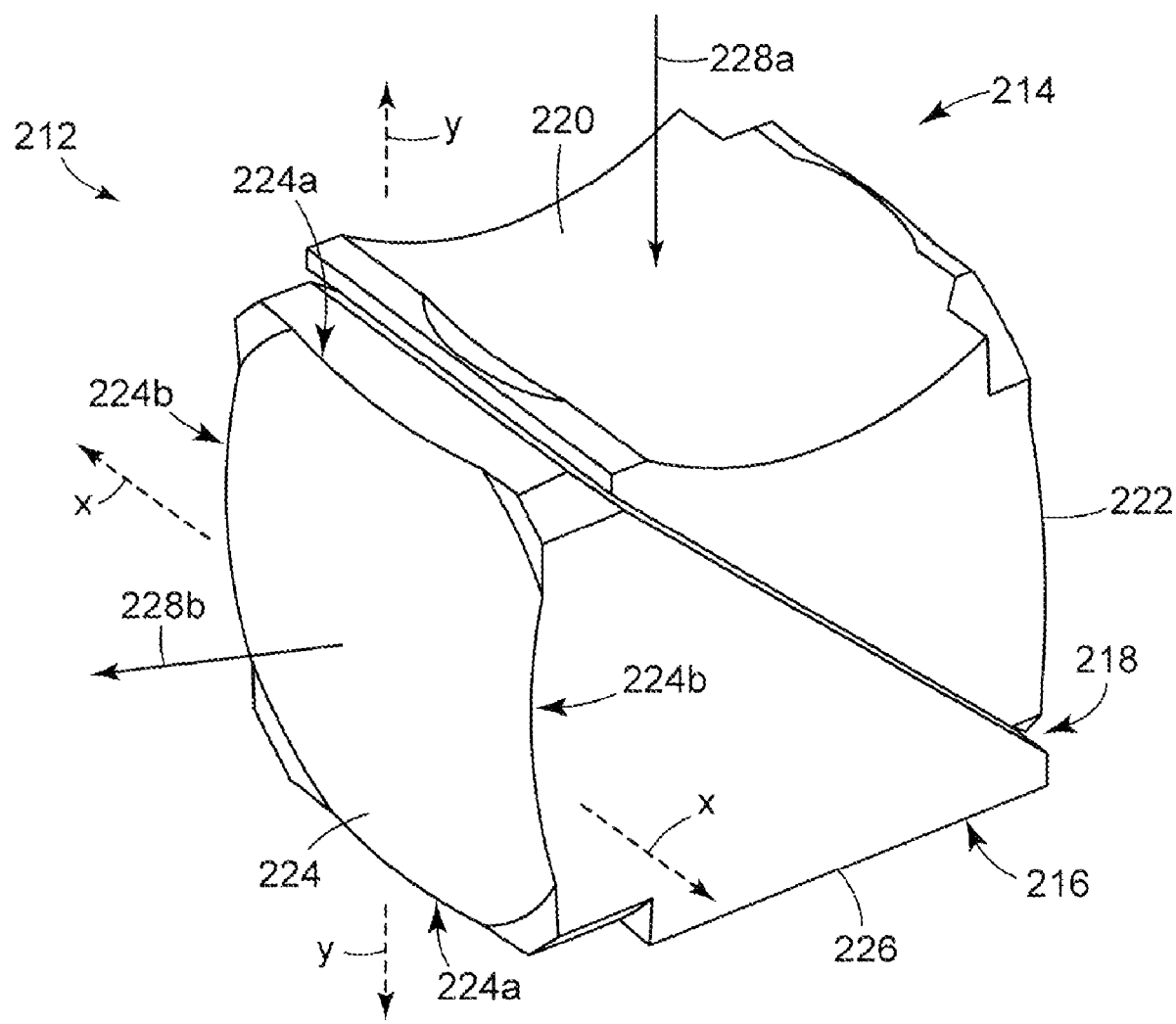
FIG. 10 is a perspective view of a PBS of the present disclosure that has an anamorphic surface.

FIG. 10 is a perspective view of PBS 212, which is an example of a suitable PBS for use with any of the image display systems disclosed herein. PBS 212 of the present disclosure is capable of reducing the number of imaging optics required to direct light to a viewing screen (not shown), and is also capable of anamorphically enhancing an image (e.g., from a 4:3 ratio to a 16:9 ratio).

PBS 212 includes input prism 214, output prism 216, and reflective polarizing film 218. Input prism 214 and output prism 216 are low-birefringence, polymeric prisms disposed adjacent each other on opposing sides of reflective polarizing film 218. Input prism 214 includes first curved outer surface 220, second curved outer surface 222, and an incident surface (not shown). Similarly, output prism 216 includes anamorphic outer surface 224, additional outer surface 226, and an incident surface (not shown). Reflective polarizing film 218 may be a polymeric reflective polarizing film that is secured between the incident surfaces of input prism 214 and output prism 216, respectively. Examples of suitable films for polarizing film 218 include the films discussed above for polarizing film 34.

As shown, first curved outer surface 220 can be a concave surface and second curved outer surface 222 can be a convex surface. Curved outer surfaces 220 and 222 function as lenses (and, generally, as refractive surfaces having optical power)

that are integrated into PBS 212, and redirect the rays of a light beam (represented by light beam 228) that are transmitted through them, thereby reducing the need for additional imaging optics. Furthermore, anamorphic outer surface 224 is an outer surface that is curved along two axial directions for anamorphically enhancing an image (e.g., from a 4:3 ratio to a 16:9 ratio). Anamorphic outer surface 224 includes a first convex curvature along an x-axis (represented by curvatures 224*a*), and a second convex curvature along a y-axis (represented by curvatures 224*b*), where curvatures 224*a* and 224*b* provide different magnifications along the x-axis and the y-axis, respectively. Accordingly, the use of anamorphic outer surface 224 eliminates the need for an additional anamorphic lens to anamorphically enhance the image.

PBS 212 may be positioned in an image display system to function as a transmissive or reflective PBS. PBS 212 is positioned such that first curved outer surface 220 is oriented to receive light beam 228*a* from an illumination source (not shown). Light beam 228*a* then transmits through PBS 212 in the same manner as discussed in the above embodiments of FIG. 2 (reflective) and FIG. 4 (transmissive). Light beam 228*a* then exits PBS 212 through anamorphic outer surface 224, thereby anamorphically enhancing light beam 228*a* to form light beam 228*b*. Light beam 228*b* then travels to the viewing screen having the same aspect ratio as light beam 228*b*.

While the PBSs discussed above in FIGS. 1-10 are shown with particular curved outer surfaces being either convex or concave, alternative PBSs of the present disclosure may include different combinations of convex and concave curvatures. Additionally, each of the curved outer surfaces of the PBSs of the present disclosure may exhibit curvature across the entire surface (e.g., curved outer surface 38 in FIG. 1) or only along the portions of the surface where light beam 28 transmits through (e.g., curved outer surface 42 in FIG. 1). In some exemplary embodiments of the present disclosure, one or more of the curved surfaces may be aspherical, anamorphic, homogenizing, cylindrical, or combinations thereof. Furthermore, one or more of the surfaces (including curved surfaces and non-curved surfaces) may include features such as diffractive elements, fresnels, microlenses, lens arrays, prismatic elements, diffusive elements, binary elements, toric elements, toroidal elements, grating elements, replicated elements (e.g., hot stamped elements), and combinations thereof.

In some additional exemplary embodiments of the present disclosure, the aspect ratios of the illumination sources are about equal to the aspect ratios of the viewing screens. Furthermore, the fold angles of the light beams may be less than 90 degrees to increase compactness. Moreover, for one or more of the embodiments shown in FIGS. 1-9, the reflective polarizing films of the PBSs (e.g., polarizing film 34) may be oriented at angles other than 45 degrees to the incident light beams. For example polarizing films 116 and 146, shown in FIGS. 6 and 7, respectively, are oriented at angles less than 45 degrees to the incident light beams (i.e., light beams 110 and 140). Examples of suitable orientation angles for the reflective polarizing films of the PBSs range from about 30 degrees to about 60 degrees, relative to the incident light beams.

As discussed above, the first and second prisms, such as the input prisms (e.g., input prisms 30, 49, 56, 112, 142, and 214), the output prisms (e.g., output prisms 32, 58, 78, 114, 144, and 216), and the single prisms (e.g., prisms 176 and 202) of the PBSs of the present disclosure are each manufactured from polymeric materials. In some exemplary embodiments, the first prism is manufactured from the first polymeric material and the second prism is manufactured from the second polymeric material. The first and second polymeric materials may be the same or different, depending on a particular application. Due to their polymeric nature, the first and second prisms may be readily manufactured in a variety of manners, such as injection molding. After the first prism and the second prism are molded, a reflective polarizing film (e.g., reflective polarizing films 34 and 60) may be adhered or otherwise disposed between the respective incident surfaces of the first prism and the second prism, which also secures the first prism relative to the second prism. Examples of suitable adhesives for the adhesion include ultraviolet-curable optical adhesives. Alternatively, at least one of the prisms may be molded against a reflective polarizing film. An example of a suitable technique for manufacturing PBSs of the present disclosure is disclosed in the co-pending and commonly-assigned application, U.S. application Ser. No. 11/192,681, filed on Jul. 29, 2005, entitled "Method for Making Polarizing Beam Splitters," the disclosure of which is incorporated by reference herein in its entirety.

In one embodiment, at least one of the prisms is formed (e.g., molded) with one or more mechanical assembly features located on the non-optical surfaces of the prisms. The mechanical assembly features are structures formed in the non-optical surfaces, which are used to mount and secure the prisms in the image display system. One skilled in the art will recognize that a variety of mechanical assembly features may be used (e.g., tabs or pegs formed in the non-optical surfaces). Preferably, each prism is formed with one or more mechanical assembly features.

After manufacturing, the PBSs of the present disclosure may be incorporated into image display systems (e.g., systems 10, 47, 52, 74, 82, 98, 130, 160, and 186). Because the PBSs of the present disclosure fold the rays of the light beams and reduce the number of required imaging optics, the image display systems may be compact for use in small imaging devices. Examples of suitable volumetric dimensions of the image display systems include volumes of about 16 cubic centimeters or less. Examples of suitable footprint areas of the image display systems include areas of about 9 square centimeters or less, where the footprint areas are taken in a plane that is parallel to views shown in FIGS. 1-10.

Examples of suitable polymers for the first prisms, the second prisms, and the single prisms of the PBSs of the present disclosure include transparent polymers such as acrylic polymers (e.g., polymethylmethacrylates), cyclic-olefin copolymers, polycarbonates, and combinations thereof. Examples of particularly suitable polymers include acrylic polymers commercially available under the trade designations "OPTOREZ OZ-1330" Series polymers from Hitachi Chemical Company, Ltd, Tokyo, Japan and "WF-100" acrylic resins from Mitsubishi Electric & Electronics US, Inc., Cypress, Calif. In one embodiment, colorants (e.g., pigments and dyes) may be added to the transparent polymers to provide prisms with colored tints. Furthermore, the input and output prisms of a given PBS of the present disclosure may include different colors. For example, a PBS of the present disclosure may function as a notching spectral bandpass filter, where the input prism functions as a low pass filter and the output prism functions as a short pass filter (or vice versa).

FIGS. 11A-11D are exploded perspective views of exemplary PBSs 314, 414, 514, and 614, which depict exemplary engagement mechanisms for securing a first prism to a second prism. PBS's 314, 414, 514, and 614 have general configurations similar to the PBS 14, where the respective reference labels are increased by 300, 400, 500, and 600. The embodiments disclosed in FIGS. 11A-11D are also suitable for use with any of the above-mentioned dual-prism embodiments of the present disclosure.

Figure 11A:
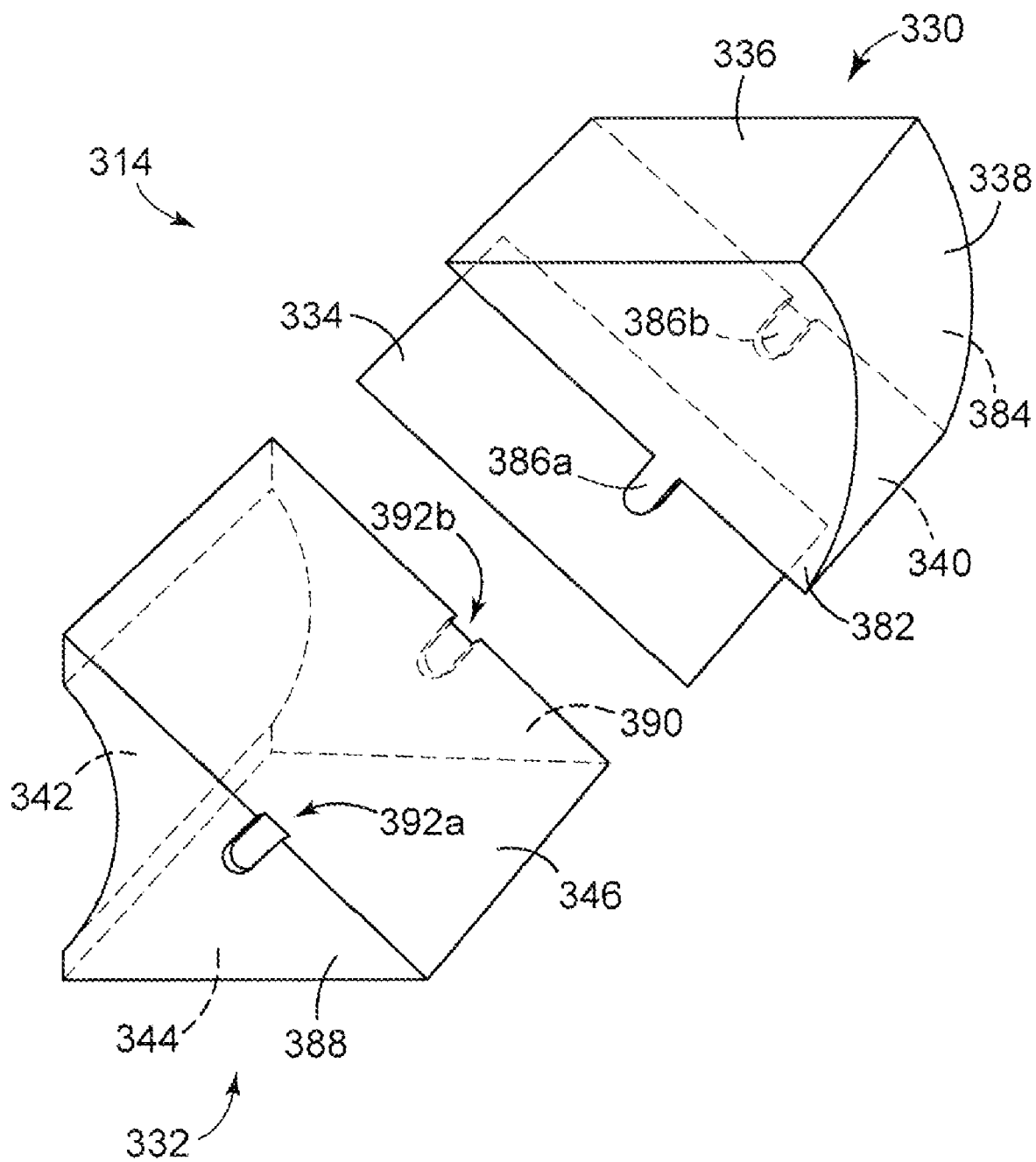
FIG. 11A-11D are exploded perspective views of additional exemplary embodiments of the reflective PBS according to the present disclosure, having general configurations similar to the PBS of FIG. 1.

As shown in FIG. 11A, first prism 330 of PBS 314 further includes left surface 382, right surface 384, and projections, such one or more male members 386a and 386b. Left surface 382 and right surface 384 are the lateral surfaces of first prism 330, and are spaced apart by an outer surface 336, a curved outer surface 338, and an incident surface 340. Male members 386a and 386b can extend respectively from left surface 382 and right surface 384 at the peripheral edges of incident surface 340, in a direction beyond incident surface 340. First prism 330 may be molded with the one or more male members 386a and 386b integrally formed with left surface 382 and/or right surface 384.

Second prism 332 includes a left surface 388 and a right surface 390. Left surface 388 and right surface 390 are the lateral surfaces of the second prism 332 and are spaced apart by a curved outer surface 342, an outer surface 344, and an incident surface 346. One or more female portions 392a and 392b, each capable of receiving one of the at least one male members 386a and 386b therein, can extend respectively within left surface 388 and right surface 390, and extend up to the peripheral edges of incident surface 346. The one or more female portions 392a and 392b may be formed during the molding of the second prism 332, or subsequently cut out of left surface 388 and/or right surface 390.

While PBS 314 is shown with male members 386a and 386b extending from the first prism 330 and with the female portions 392a and 392b disposed in the second prism 332, an opposite orientation may alternatively be used. In this alternative design, male members 386a and 386b extend from the second prism 332 and female portions 392a and 392b are disposed in the first prism 330. In another alternative design, first prism 330 may include a first male member and a first female portion that correspond to a second male member and a second female portion of second prism 332.

Figure 11B:
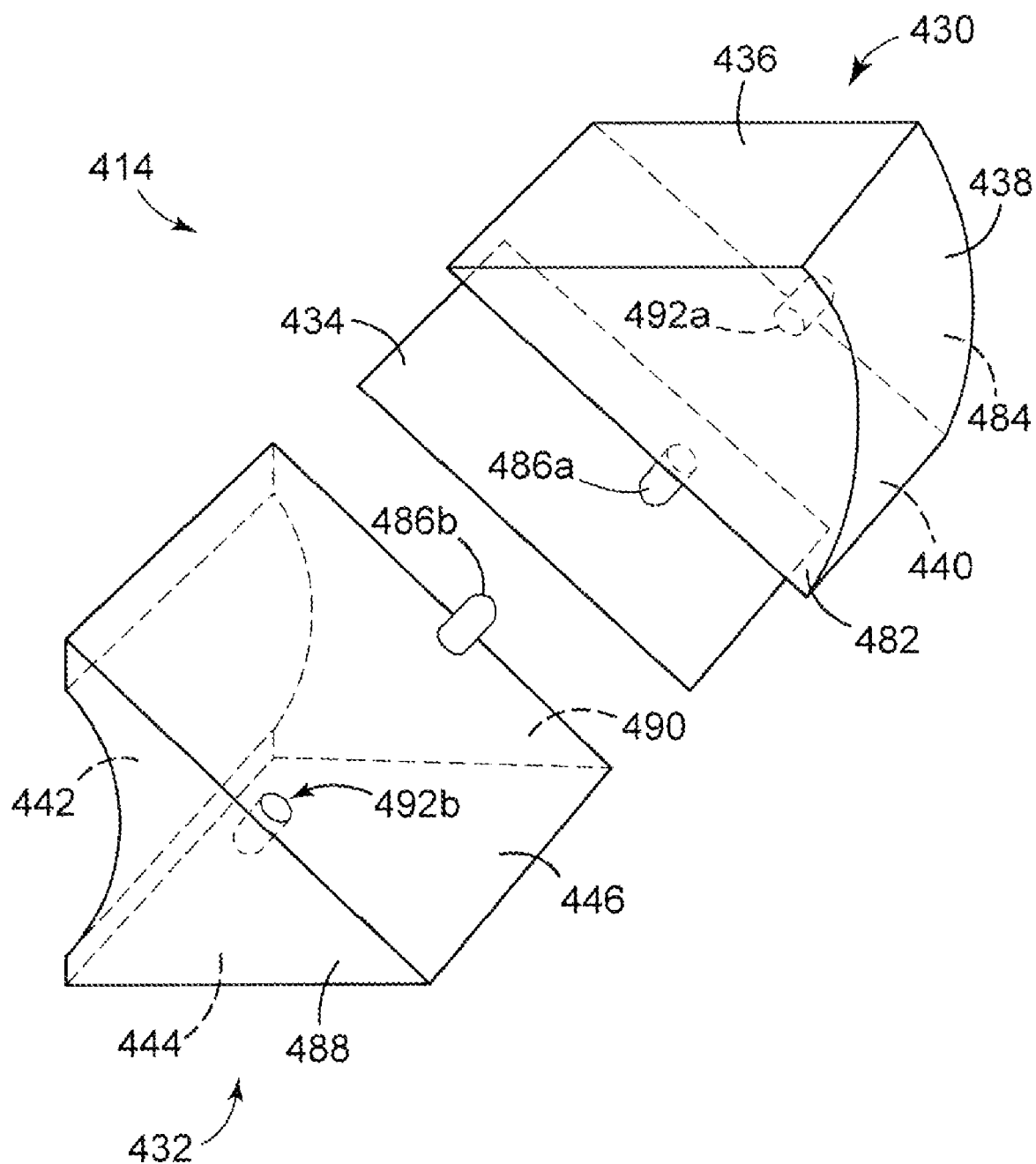

FIG. 11B depicts PBS 414, which is similar to PBS 314 and includes first prism 430 and second prism 432, where first prism 430 includes male member 486a and female portion 492a, and second prism 432 includes male member 486b and female portion 492b. Male members 486a and 486b are pegs respectively disposed on incident surfaces 440 and 446 (i.e., the surfaces adjacent to the reflective polarizing film), and project therefrom. Similarly, female portions 492a and 492b are depressions respectively disposed in incident surfaces 440 and 446.

Figure 11C:
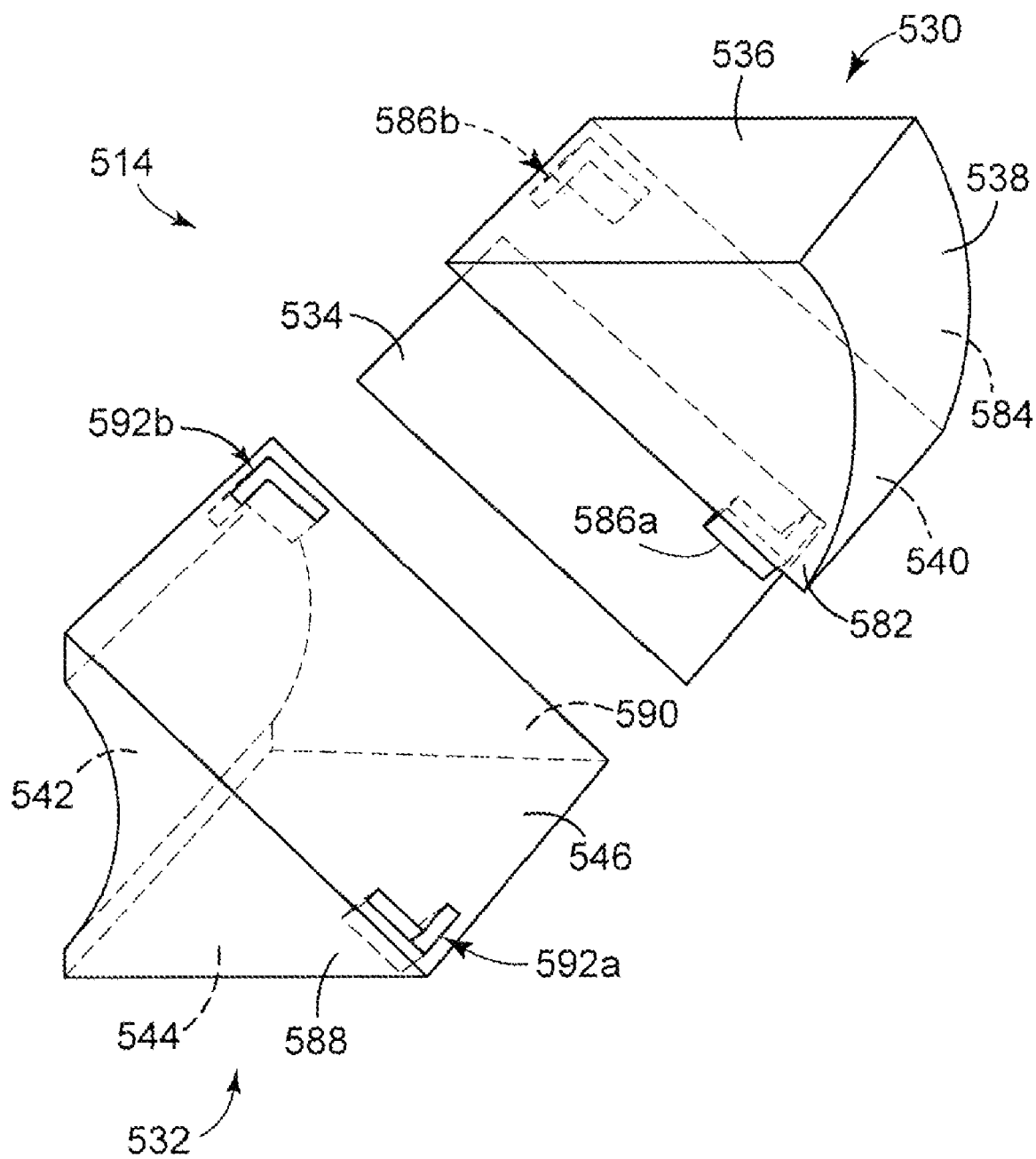

FIG. 11C depicts PBS 514, which is also similar to PBS 314 and includes first prism 530 and second prism 532, where first prism 530 includes male members 586a and 586b, and second prism 532 includes female portions 592a and 592b. Male members 586a and 586b are "L"-shaped members disposed on incident surface 540, and project therefrom. Similarly, female portions 592a and 592b are "L"-shaped members disposed in incident surface 546, and are configured as depressions or slots formed therein.

Figure 11D:
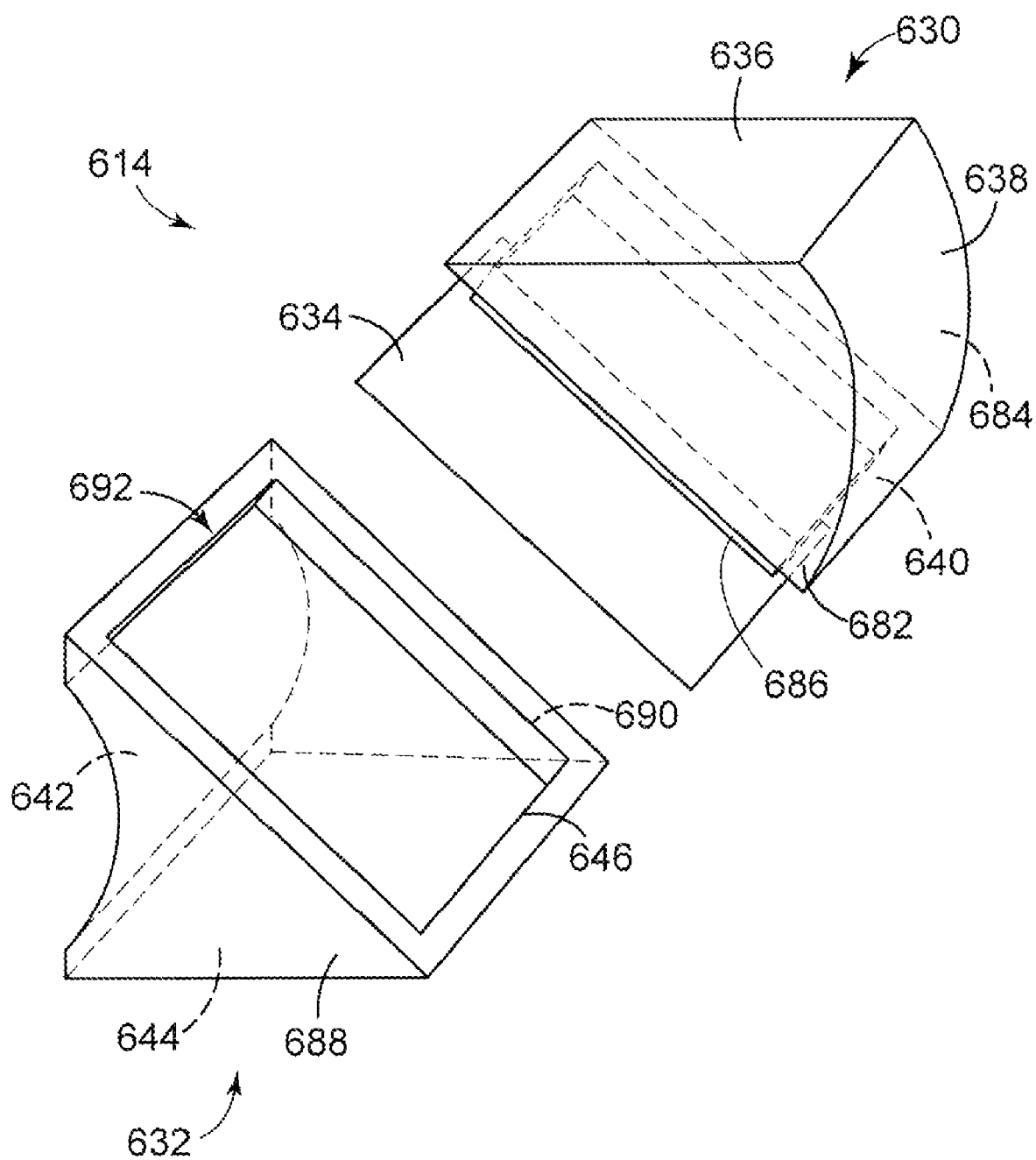

FIG. 11D depicts PBS 614, which is also similar to PBS 314 and includes first prism 630 and second prism 632, where first prism 630 includes male member 686, and second prism 632 includes female portion 692. Male member 686 is a rectangular surface that encompasses the majority of incident surface 640, and which projects therefrom. Similarly, female portion 692 is a rectangular depression that is disposed within the majority of incident surface 646. Reflective polarizing film 634 may then be disposed between male member 686 and female portion 692 when first prism 630 is secured to second prism 632.

During the manufacturing of each of PBSs 314, 414, 514, and 614, the reflective polarizing film may be placed between the first prism and the second prism. The first prism may then be oriented relative to the second prism such that the male member (e.g., male members 386a and 386b) are aligned with the corresponding female portions (e.g., female portions 392a and 392b). This alignment is beneficial for ensuring that the first prism is accurately positioned relative to the second prism. The first prism may then engage second prism by concurrently inserting male members into the corresponding female portions. This compresses the reflective polarizing film between the incident surfaces of the first prism and the second prism to provide a smooth, planar interface. The male members may be secured to the corresponding female portions with an adhesive. Additionally, the first prism may be secured to the second prism by fitting and/or welding the male members to the corresponding female portions (e.g., ultrasonic, infrared, heat staking, snap fits, press fits, and chemical welding).

The male members and female portions illustrated in FIGS. 11A-11D may be substituted with other engagement mechanisms such that one prism includes at least one male member that is configured to engage with a respective female portion located in the opposing prism. As discussed above, while the male members and female portions are shown in use with PBS 314, the alternative engagement mechanisms are suitable for any dual-prism PBS of the present disclosure (e.g., PBSs 48, 54, 76, 86, 102, 134, and 212). Those of ordinary skill in the art will also readily appreciate that different numbers of the male members and the female portions than those exemplified herein may be used in accordance with the present disclosure. For example, an exemplary PBS may include three or more male members received within three or more female portions.

Although the present invention has been described with reference to exemplary embodiments, workers skilled in the art will recognize that changes may be made in form and detail without departing from the spirit and scope of the disclosure. For example, some optical elements described herein may be replaced with other similar optical elements or eliminated altogether.

The invention claimed is:

1. A polarizing beam splitter comprising:
    a first prism comprising a polymeric material, the first prism having a first convex outer surface, a second concave outer surface, and a first incident surface, wherein the first prism is configured to transmit light through at least the first convex outer surface and the second concave outer surface; and
    a reflective polarizing film disposed adjacent the first incident surface of the first prism.

2. The polarizing beam splitter of claim 1, wherein at least one of the first convex outer surface and the second concave outer surface has a geometry selected from the group consisting of an aspherical surface, an anamorphic surface, a cylindrical surface, a sub-lens array surface, and combinations thereof.

3. The polarizing beam splitter of claim 1, further comprising a second prism comprising a second polymeric material, the second prism having a third curved outer surface and a second incident surface, wherein the reflective polarizing film disposed between the first incident surface of the first prism and the second incident surface of the second prism.

4. The polarizing beam splitter of claim 3, wherein the first prism comprises at least one male member disposed on a surface adjacent to the reflective polarizing film and projecting therefrom, and wherein the second prism comprises at least one female portion capable of receiving the at least one male member therein.

5. The polarizing beam splitter of claim 1, wherein the polymeric material is selected from the group consisting of acrylic polymers, cyclic-olefin copolymers, polycarbonates, and combinations thereof.

6. The polarizing beam splitter of claim 1, wherein the first convex outer surface is orientated at a tilted angle from an optical axis of the second concave outer surface.

7. The polarizing beam splitter of claim 1, wherein at least one of the first convex outer surface and the second concave outer surface is curved along two axial directions.

8. The polarizing beam splitter of claim 1, wherein the first prism exhibits a colored tint.

* * * * *

UNITED STATES PATENT AND TRADEMARK OFFICE
CERTIFICATE OF CORRECTION

PATENT NO.          : 7,529,029 B2
APPLICATION NO.  : 11/427091
DATED                  : May 5, 2009
INVENTOR(S)         : John E. Duncan It is certified that error appears in the above-identified patent and that said Letters Patent is hereby corrected as shown below:

Column 10,
Line 16, delete "ox" and insert -- α --, therefor.

Signed and Sealed this

Sixth Day of October, 2009

David J. Kappos
*Director of the United States Patent and Trademark Office*